US009058403B2

(12) United States Patent
Jung et al.

(10) Patent No.: US 9,058,403 B2
(45) Date of Patent: Jun. 16, 2015

(54) DATA DISPLAY APPARATUS USING CATEGORY-BASED AXES

(75) Inventors: Woojun Jung, Seoul (KR); Ilyong Park, Gyeonggi-Do (KR); Byoungsu Kang, Seoul (KR); Seongpyo Hong, Gyeonggi-Do (KR); Heekwon Kang, Seoul (KR); Jaeho Na, Seoul (KR)

(73) Assignee: LG Electronics Inc., Seoul (KR)

( * ) Notice: Subject to any disclaimer, the term of this patent is extended or adjusted under 35 U.S.C. 154(b) by 541 days.

(21) Appl. No.: 12/782,331

(22) Filed: May 18, 2010

(65) Prior Publication Data

US 2011/0055762 A1 Mar. 3, 2011

(30) Foreign Application Priority Data

Sep. 1, 2009 (KR) .................. 10-2009-0082176

(51) Int. Cl.
 *G06F 3/048* (2013.01)
 *G06F 17/30* (2006.01)
 *G06F 3/0481* (2013.01)

(52) U.S. Cl.
 CPC ........ *G06F 17/30905* (2013.01); *G06F 3/0481* (2013.01)

(58) Field of Classification Search
 CPC ... G06F 9/4443; G06F 3/0481; G06F 3/0482; G06F 3/04817
 USPC .................. 715/764, 810, 825, 835, 838, 853
 See application file for complete search history.

(56) References Cited

U.S. PATENT DOCUMENTS

| 5,945,982 | A  | * | 8/1999  | Higashio et al. ............... 1/1 |
| 6,775,659 | B2 |   | 8/2004  | Clifton-Bligh |
| 7,574,434 | B2 | * | 8/2009  | Galuten ............................ 1/1 |
| 7,634,740 | B2 | * | 12/2009 | Enomoto et al. ............ 715/810 |
| 7,716,604 | B2 | * | 5/2010  | Kataoka et al. ............. 715/835 |
| 2006/0184868 | A1 | * | 8/2006 | Chen et al. ................. 715/500.1 |
| 2006/0236251 | A1 | * | 10/2006 | Kataoka et al. ............. 715/757 |
| 2008/0115083 | A1 | * | 5/2008 | Finkelstein et al. ......... 715/805 |
| 2008/0177727 | A1 | * | 7/2008 | Pickelsimer ..................... 707/5 |
| 2009/0125842 | A1 | * | 5/2009 | Nakayama .................. 715/835 |
| 2009/0287696 | A1 | * | 11/2009 | Galuten ........................... 707/5 |
| 2010/0175031 | A1 | * | 7/2010 | Alton et al. ................. 715/841 |
| 2010/0241953 | A1 | * | 9/2010 | Kim et al. .................... 715/256 |
| 2010/0313166 | A1 | * | 12/2010 | Nakayama et al. .......... 715/810 |

* cited by examiner

*Primary Examiner* — Rashawn Tillery
(74) *Attorney, Agent, or Firm* — Fish & Richardson P.C.

(57) ABSTRACT

A user input selecting a first data item is received. Multiple informational categories associated with the selected first data item are accessed based on the received user input selecting the first data item. Multiple data items within a first of the multiple informational categories associated with the selected first data item are retrieved. Multiple data items within a second of the multiple informational categories associated with the selected first data item are retrieved. A display is generated. The display includes the first data item, the multiple retrieved data items within the first informational category arranged according to a first category-based axis that extends away from the first data item, and the multiple retrieved data items within the second informational category arranged according to a second category-based axis that extends away from the first data item. Rendering of the generated display is enabled.

29 Claims, 14 Drawing Sheets

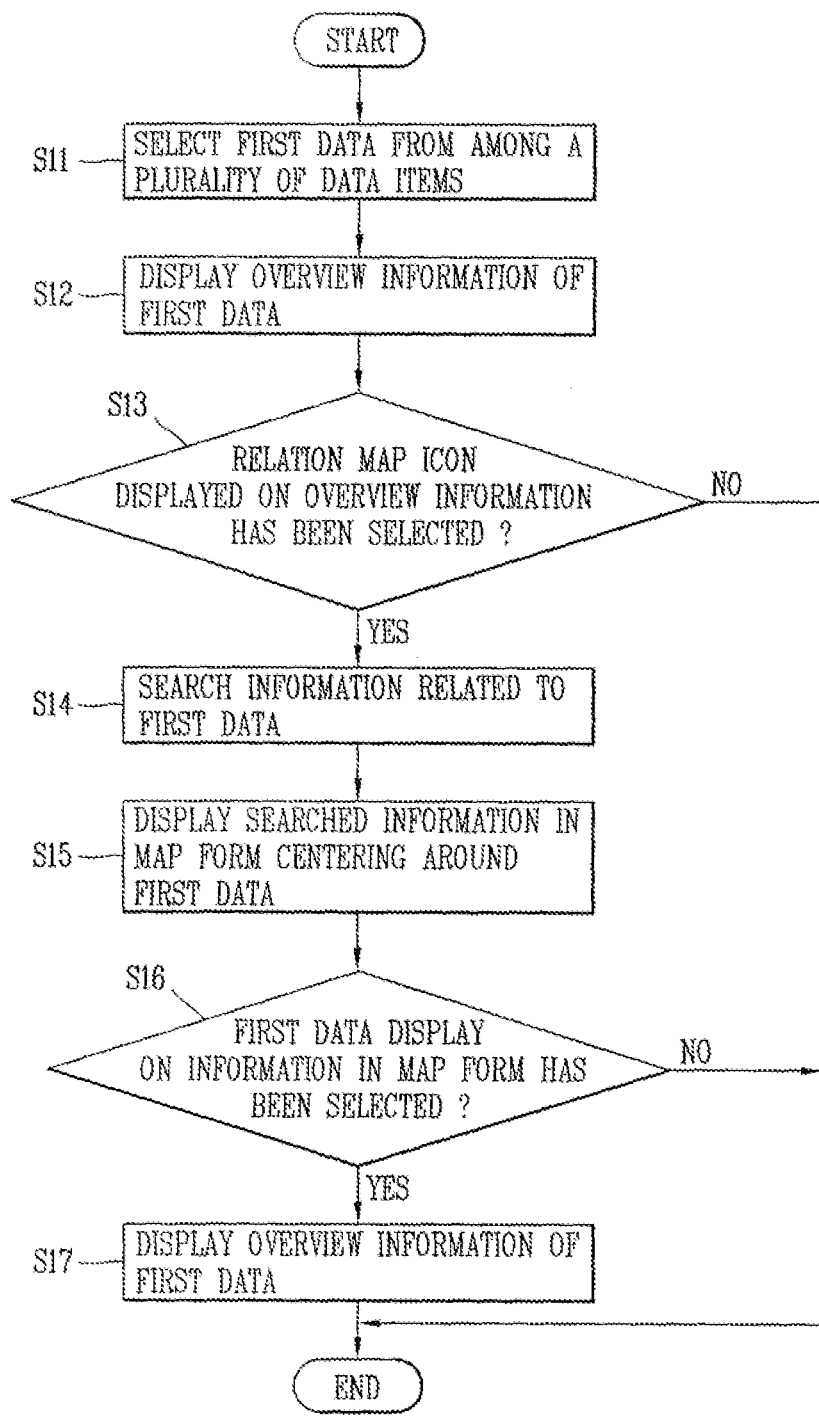

FIG. 7

| All | Pos | Type | Name |
|---|---|---|---|
| Movie | 🏠 | ♫ | Dark |
| Music | 🏠 | 💿 | Dark Angel |
| Photo | ☁ | 💿 | Dark Knight |
| HDD | 🏠 | ♫ | Dark Light |
| USB | 🏠 | ♫ | Dark Moor |
| DISC | 🏠 | ♫ | Dark Passion Play |
| DLNA | ☁ | | Dark Side of the Moon |
| CIFS | 🏠 | ♫ | Dark Tranquillity |
| Online | 🏠 | 💿 | Dark Water |

FIG. 8

| Movie | Pos | Name | Genre | Enjoy | Rating |
|---|---|---|---|---|---|
| P.Actor | 🏠 | Dark Angel | Action | ▷ | ★ |
| S.Actor | 🏠 | Dark Knight | Action | ▷▷▷ | ★★★★★ |
| Director | ☁ | Dark Shadows | Thriller | ▷ | ★★ |
| Series | 🏠 | Dark City | Action | ▷▷ | ★ |
| | 🏠 | Dark Blue | Comedy | New | Not Rated |
| | 🏠 | Darkness | Horror | ▷ | ★★ |
| | ☁ | Dark Water | Horror | ▷ | ★★★ |
| | 🏠 | Darkness | Horror | New | Not Rated |
| | 🏠 | Darkness Falls | Action | ▷ | ★ |

8-1

FIG. 14
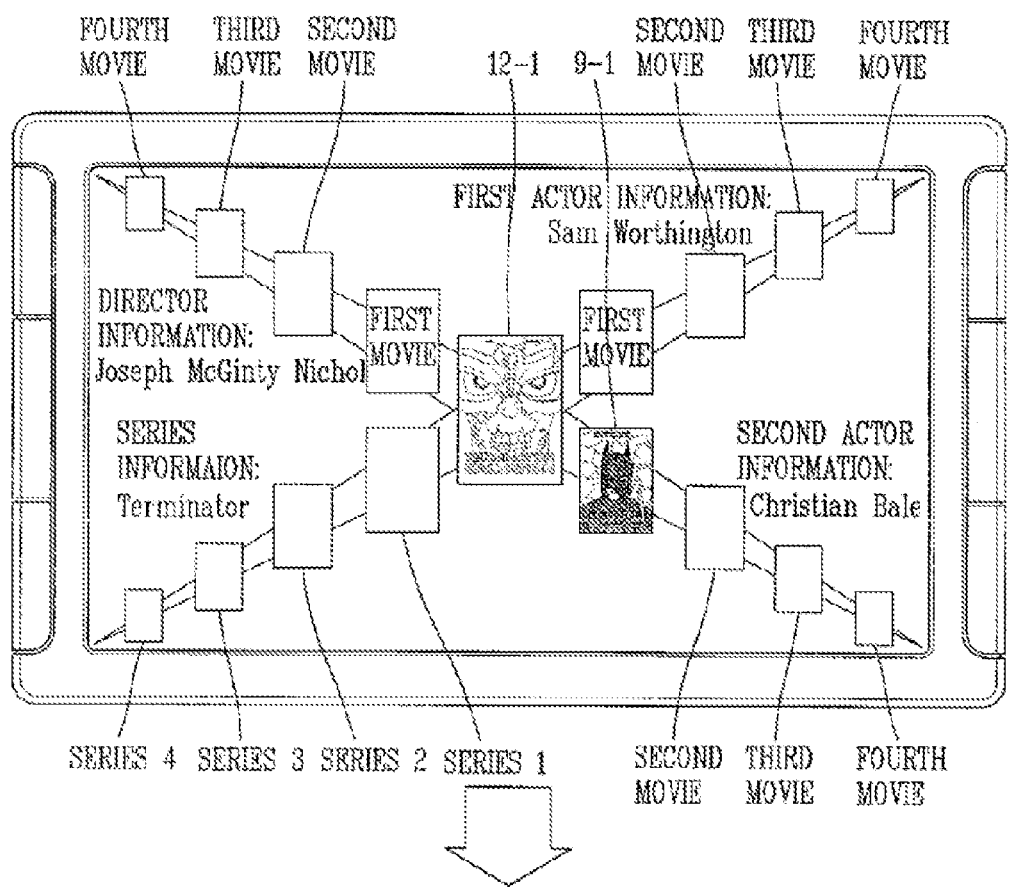
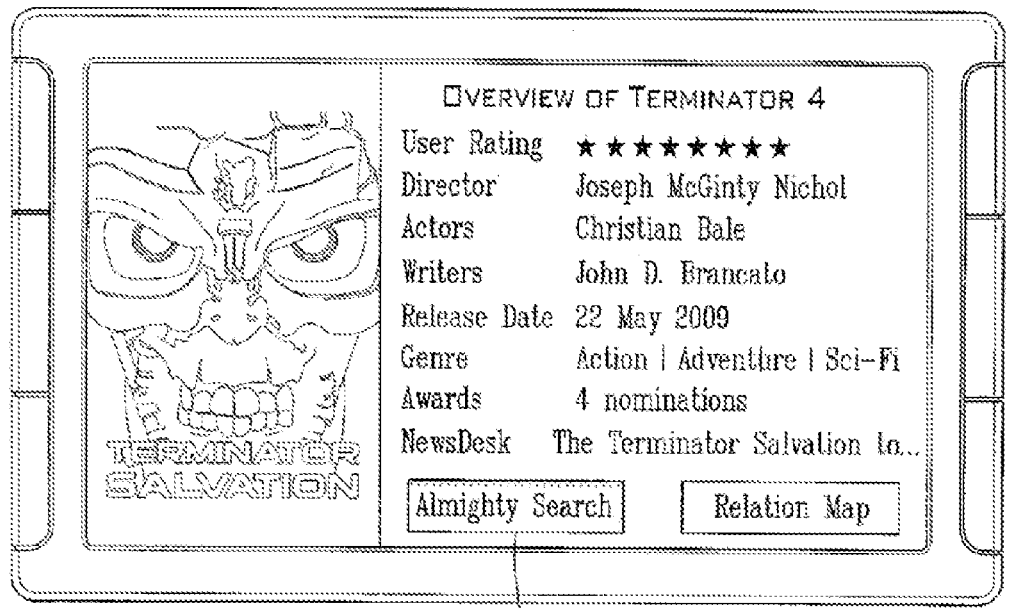

FIG. 19
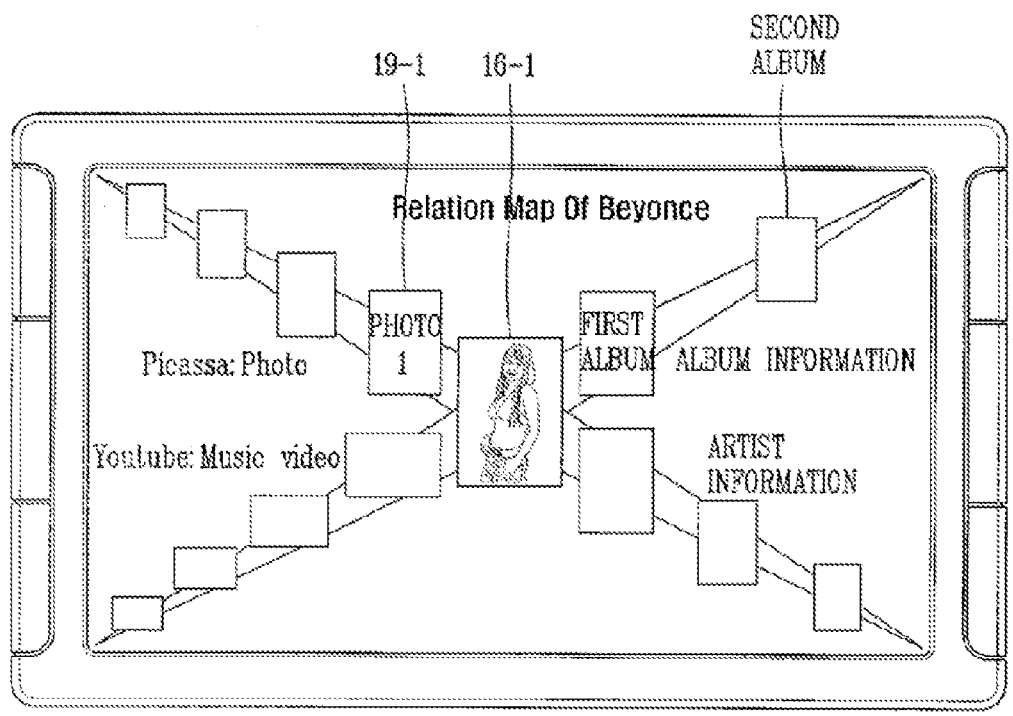
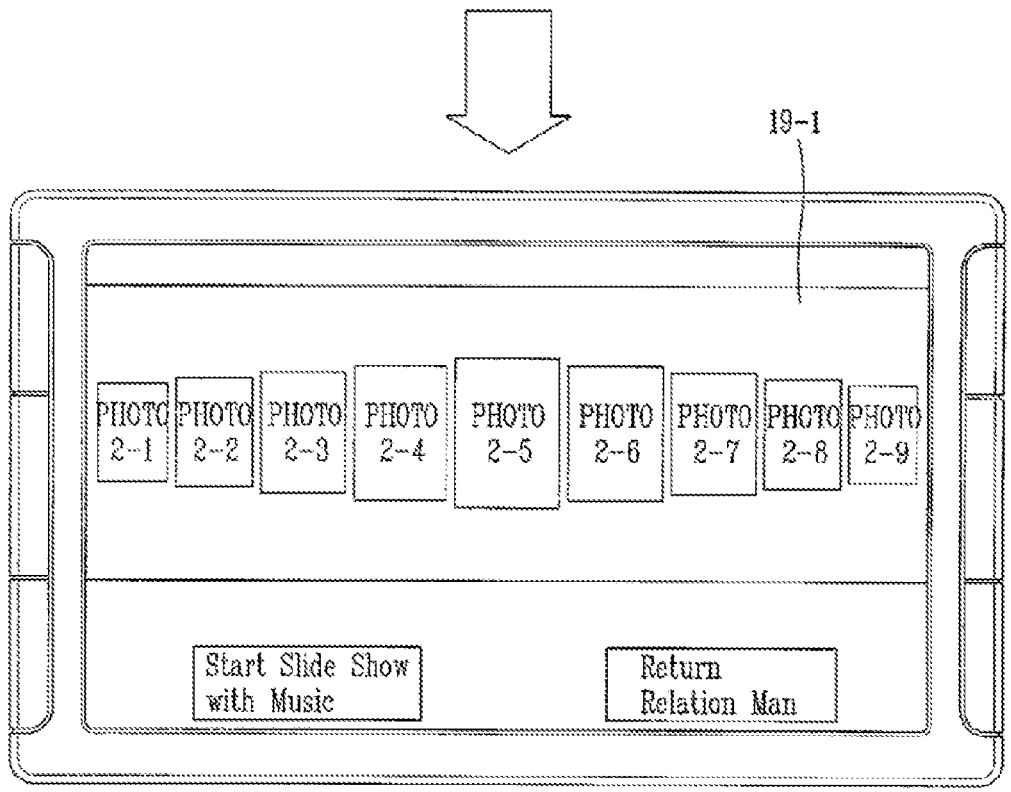

DATA DISPLAY APPARATUS USING CATEGORY-BASED AXES

CROSS-REFERENCE TO A RELATED APPLICATION

Pursuant to 35 U.S.C. §119(a), this application claims the benefit of the earlier filing date and right of priority to Korean Application No. 10-2009-0082176, filed on Sep. 1, 2009, the contents of which is incorporated by reference herein in its entirety.

BACKGROUND

Mobile devices can be used to provide wireless communication between users. In particular, a user of a mobile device can place a telephone call to a landline or to another user of a mobile device. As mobile device capability has advanced in recent years, mobile devices have increasingly become able to provide functionality in addition to wireless communication. For example, some mobile devices provide internet access and other functionality. Moreover, as additional functionality is provided by mobile devices, additional means of rendering can also be employed.

SUMMARY

In general, in some aspects, a method of displaying categories of information on a mobile terminal includes receiving a user input selecting a first data item and accessing, based on the received user input selecting the first data item, multiple informational categories associated with the selected first data item. The method also includes retrieving multiple data items within a first of the multiple informational categories associated with the selected first data item. The method further includes retrieving multiple data items within a second of the multiple informational categories associated with the selected first data item and generating a display. The generated display includes the first data item and the multiple retrieved data items within the first informational category arranged according to a first category-based axis that extends away from the first data item. The generated display also includes the multiple retrieved data items within the second informational category arranged according to a second category-based axis that extends away from the first data item. The generated display further includes enabling rendering, on a display of a mobile terminal, of the generated display that includes the first data item, the multiple retrieved data items within the first informational category arranged according to the first category-based axis that extends away from the first data item, and the multiple retrieved data items within the second informational category arranged according to the second category-based axis that extends away from the first data item.

In other implementations, some aspects include a method. The method includes selecting a data item and accessing, based on the selection of the data item, multiple informational categories associated with the selected data item. The method also includes retrieving multiple data items with a first of the multiple informational categories associated with the selected data item. The method further includes retrieving multiple data items with a second of the multiple informational categories associated with the selected data item. Additionally, the method includes enabling generation of a display that includes the first data item, the multiple retrieved data items within the first informational category arranged according to a first category-based axis that extends away from the first data item, and the multiple retrieved data items within the second informational category arranged according to a second category-based axis that extends away from the first data item.

This and other implementations can optionally include one or more of the following features, which also may optionally be in any combination. For example, selecting the data item may include selecting a data item that corresponds to a first movie, accessing the multiple informational categories associated with the selected data item may include accessing multiple informational categories associated with the first movie, retrieving the multiple data items within the first of multiple informational categories may include retrieving multiple data items corresponding to other movies starring an actor who acted in the first movie, retrieving the multiple data items within the second of multiple informational categories may include retrieving multiple data items corresponding to other movies directed by a director who directed the first movie, and enabling generation of the display may include enabling generation of a display that renders an icon corresponding to the first movie, icons corresponding to the other movies starring the actor who acted in the first movie arranged in a row according to the first category-based axis that extends away from the icon corresponding to the first movie, and icons corresponding to the other movies directed by the director who directed the first movie arranged in a row according to the second category-based axis that extends away from the icon corresponding to the first movie.

Also, selecting the data item may include selecting a data item that corresponds to an artist, accessing the multiple informational categories associated with the selected data item may include accessing multiple informational categories associated with the artist, retrieving the multiple data items within the first of multiple informational categories may include retrieving multiple data items corresponding to songs by the artist, retrieving the multiple data items within the second of multiple informational categories may include retrieving multiple data items corresponding to photos of the artist, and enabling generation of the display may include enabling generation of a display that renders an icon corresponding to the artist, icons corresponding to songs by the artist arranged in a row according to the first category-based axis that extends away from the icon corresponding to the artist, and icons corresponding to the photos of the artist arranged in a row according to the second category-based axis outward that extends away from the icon corresponding to the artist.

The method may additionally include receiving a selection of a first icon of the rendered icons corresponding to the songs by the artist arranged in the row according to the first category-based axis that extends away from the icon corresponding to the artist, accessing, based on the selection of the first icon, a media item of the song to which the selected first icon corresponds, and enabling rendering of the accessed media item. Selecting a data item may include receiving user input selecting an item rendered on a display of a mobile terminal. Accessing the multiple informational categories associated with the selected data item may include accessing, from computer-readable memory, an association between the multiple informational categories and the selected data item. Retrieving the multiple data items within the first informational category may include retrieving, from computer-readable memory of a mobile terminal, the multiple data items within the first informational category and retrieving the multiple data items within the second informational category may include retrieving, from the computer-readable memory of the mobile terminal, the multiple data items within the second informational category.

Further, retrieving the multiple data items within the first informational category may include retrieving, from an Internet website, the multiple data items within the first informational category and retrieving the multiple data items within the second informational category may include retrieving, from the Internet website, the multiple data items within the second informational category. The first category-based axis may be a linear axis with a first angle relative to a reference line and the second category-based axis may be a linear axis with a second angle relative to the reference line that differs from the first angle. The second angle may be perpendicular to the first angle. The method may further include retrieving multiple data items within a third of the multiple informational categories associated with the selected data item and retrieving multiple data items within a fourth of the multiple informational categories associated with the selected data item. Enabling generation of the display may include enabling generation of a display that includes the first data item, the multiple retrieved data items within the first informational category arranged according to a first category-based axis that extends away from the first data item, the multiple retrieved data items within the second informational category arranged according to a second category-based axis that extends away from the first data item, the multiple retrieved data items within the third informational category arranged according to a third category-based axis that extends away from the first data item, and the multiple retrieved data items within the fourth informational category arranged according to a fourth category-based axis that extends away from the first data item.

Enabling generation of the display may include enabling generation of a display that renders icons corresponding to the multiple retrieved data items within the first informational category arranged in a row according to the first category-based axis that extends away from the first data item and that renders icons corresponding to the multiple retrieved data items within the second informational category arranged in a row according to the second category-based axis that extends away from the first data item. The method may also include receiving a selection of a first icon of the rendered icons corresponding to the multiple retrieved data items within the first informational category arranged in the row according to the first category-based axis that extends away from the first data item, accessing, based on the selection of the first icon, information corresponding to the selected first icon, and enabling rendering of the accessed information corresponding to the selected first icon.

In other implementations, some aspects include a device. The device includes a computer-readable memory, a display, and a controller. The controller is configured to receive a user input selecting a data item and access, based on a selection of the data item and from the computer-readable memory, multiple informational categories associated with the selected data item. The controller is also configured to retrieve multiple data items within a first of multiple informational categories associated with the selected data item and retrieve multiple data items within a second of multiple informational categories associated with the selected data item. The controller is further configured to enable rendering, on the display, of the selected data item, the multiple retrieved data items within the first informational category arranged according to a first category-based axis that extends away from the first data item, and the multiple retrieved data items within the second informational category arranged according to a second category-based axis that extends away from the first data item.

This and other implementations can optionally include one or more of the following features, which also may optionally be in any combination. For example, to access the multiple informational categories associated with the selected data item, the controller can be configured to access, from the computer-readable memory, an association between the multiple informational categories and the selected data item. To retrieve the multiple data items within the first informational category, the controller can be configured to retrieve, from the computer-readable memory, the multiple data items within the first informational category and, to retrieve the multiple data items within the second informational category, the controller can be configured to retrieve, from the computer-readable memory, the multiple data items within the second informational category.

Also, to retrieve the multiple data items within the first informational category, the controller can be configured to retrieve, from an Internet website, the multiple data items within the first informational category and, to retrieve the multiple data items within the second informational category, the controller can be configured to retrieve, from the Internet website, the multiple data items within the second informational category. The first category-based axis may be a linear axis with a first angle relative to a reference line and the second category-based axis may be a linear axis with a second angle relative to a reference line that differs from the first angle. The second angle may be perpendicular to the first angle. To enable rendering, the controller can be configured to enable rendering of an icon corresponding to the first data item, icons corresponding to the multiple retrieved data items within the first informational category arranged in a row according to the first category-based axis that extends away from the icon corresponding to the first data item, and icons corresponding to the multiple retrieved data items within the second informational category arranged in a row according to the second category-based axis that extends away from the icon corresponding to the first data item. The controller may include one or more processors.

Further scope of applicability will become apparent from the detailed description given hereinafter. However, it should be understood that the detailed description and specific examples, while indicating various implementation, are given by illustration only, since various changes and modifications within the spirit and scope of the description will become apparent to those skilled in the art from this detailed description.

BRIEF DESCRIPTION OF THE DRAWINGS

FIG. 6 is a flow chart of a first process for data display.

FIGS. 7 and 8 are overviews of display screens illustrating selection of data.

FIG. 14 is an overview of display screens illustrating overview information.

FIG. 19 is an overview of a display screen illustrating display of a photo image.

DETAILED DESCRIPTION

Figure 1:
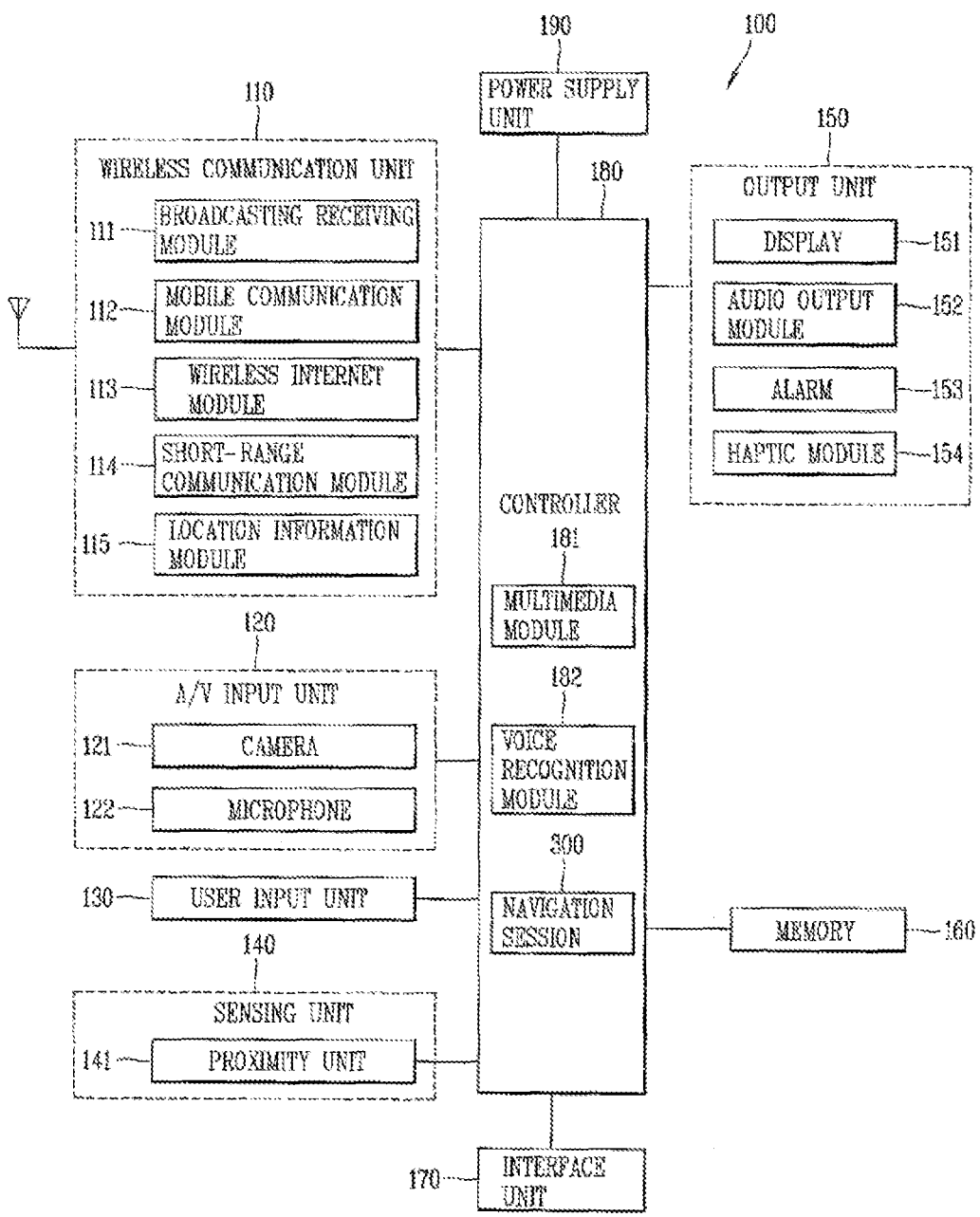
FIG. 1 is a schematic block diagram showing a configuration of a mobile communication terminal.

FIG. 1 is a schematic block diagram showing a configuration of a mobile communication terminal employing an image display apparatus according to an exemplary implementation. The mobile communication terminal 100 may be implemented in various forms, such as mobile phones, smart phones, notebook computers, digital broadcast terminals, Personal Digital Assistants (PDAs) or Portable Multimedia Player (PMPs).

As shown in FIG. 1, the mobile communication terminal 100 includes a wireless communication unit 110, an Audio/Video (A/V) input unit 120, a user input unit 130, a sensing unit 140, an output unit 150, a memory 160, an interface unit 170, a controller 180, and a power supply unit 190. FIG. 1 shows the mobile communication terminal 100 having various components, but it is understood that implementing all of the illustrated components is not a requirement. In particular, various implementations of the mobile communication terminal 100 may include greater or fewer components in configurations other than the configuration illustrated by FIG. 1.

The wireless communication unit 110 can include one or more components that enable radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server or other network entity (not shown) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, or other signals. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, broadcast associated information may be implemented according to various formats, such as electronic program guide (EPG) of digital multimedia broadcasting (DMB), and electronic service guide (ESG) of digital video broadcast-handheld (DVB-H).

The broadcast receiving module 111 may be configured to receive signals broadcast using various types of broadcast systems. In particular, the broadcast receiving module 111 may receive a digital broadcast using a digital broadcast system, such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), or other broadcast systems. The broadcast receiving module 111 may be configured to be suitable for broadcast systems that provide a broadcast signal as well as the above-mentioned digital broadcast systems. Broadcast signals and/or broadcast-associated information received via the broadcast receiving module 111 may be stored in the memory 160.

The mobile communication module 112 may transmit and receive radio signals to and from at least one of a base station (e.g., access point or node), an external terminal (e.g., other user devices) and a server or other network entity. Such radio signals may include a voice call signal, a video call signal, or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA) may be used. The short-range communication module 114 is a module for supporting short range communications. Some examples of short-range communication technology include Bluetooth™, Radio Frequency IDentification (RFID), Infrared Data Association (IrDA), Ultra-WideBand (UWB), and ZigBee™.

The location information module 115 is a module for checking or acquiring a location (or position) of the mobile communication terminal or vehicle in which the mobile communication terminal is located. For example, the location information module 115 may be embodied using a Global Positioning System (GPS) module that receives location information from a plurality of satellites. Here, the location information may include coordinate information represented by latitude and longitude values. For example, the GPS module may measure time and distance with respect to three or more satellites so as to calculate a current location of the mobile communication terminal 100 according to trigonometry based on the measured time and distances. A method of acquiring distance and time information from three satellites and performing error correction with a single satellite may be used. In particular, the GPS module may acquire time and three-dimensional speed information as well as a latitude, longitude, and altitude from the location information received from the satellites. A Wi-Fi position system and/or hybrid positioning system may be used as the location information module 115.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on the display unit 151 (or other visual output device). The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds via a microphone in a phone call mode, a recording mode, a voice recognition mode, or other modes, and can process the received sounds into audio data. In implementations using mobile telephone systems, the processed audio data may be converted for output into a format transmittable to a mobile communication base station (or other network entity) via the mobile communication module 112. The microphone 122 may implement various types of noise canceling or suppression algorithms to cancel or suppress noise or interference generated in the course of receiving and transmitting audio signals.

The user input unit 130 may generate key input data from commands entered by a user to control various operations of the mobile communication terminal 100. The user input unit 130 allows the user to enter various types of information, and may include a keypad, a dome switch, a touch pad (e.g., a touch sensitive member that detects changes in resistance, pressure, or capacitance due to being contacted) a jog wheel, a jog switch, or other input mechanisms. In particular, when the touch pad is overlaid on the display unit 151 in a layered manner, it may form a touch screen.

The sensing unit 140 detects a current status or state of the mobile communication terminal 100, such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, or other input mechanisms so as to generate commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface by which at least one external device may be connected with the mobile communication terminal 100. For example, the external devices may include wired or wireless headset ports, an external power supply or battery charger ports, wired or wireless data ports, memory card ports, ports for connecting a device having an identification module, audio input/output (I/O) ports, video I/O ports, or earphone ports. Here, the identification module may be a memory chip or other element with memory or storage capabilities that stores various information for authenticating a user's authority for using the mobile communication terminal 100. This information may include, for example, a user identity module (UIM), a subscriber identity module (SIM), or a universal subscriber identity module (USIM).

In addition, the device having the identification module (referred to as the 'identifying device', hereinafter) may take the form of a smart card. Accordingly, the identifying device may be connected with the mobile communication terminal 100 via a port or other connection means. The interface unit 170 may be used to receive inputs (e.g., data, information, or power) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, or vibration signal). The output unit 150 may include the display unit 151, an audio output module 152, an alarm unit 153, or other units.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging or multimedia file downloading). When the mobile terminal 100 is in a video call mode or image capturing mode, the display unit 151 may display a captured image and/or a received image, or a UI or GUI that shows videos or images and functions related thereto.

The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. The mobile terminal 100 may include two or more display units or other display means according to its particular desired functionality. For example, the mobile terminal may include both an external display unit (not shown) and an internal display unit (not shown). When the display unit 151 and the touch pad are overlaid in a layered manner to form a touch screen, the display unit 151 may function as both an input device and an output device. The touch sensor may, for example, have the form of a touch film, a touch sheet, or a touch pad. In some cases, touch sensors (or touch screens) can operate without physical contact. For example, touch screens operating on changed capacitance or other electrical characteristics may operate by the nearby presence of a finger or object with or without physical contact with the screen. As such, a "touch screen" may not actually require a touch for operation.

The touch sensor may be configured to convert the pressure applied to a particular portion of the display unit 151 or a change in capacitance or other electrical characteristic generated at a particular portion of the display unit 151 into an electrical input signal. The touch sensor may be configured to detect a touch input pressure as well as a touch input position and a touch input area. When there is a touch input with respect to the touch sensor, the corresponding signal is sent to a touch controller (not shown). The touch controller processes the signal and transmits corresponding data to the controller 180. Accordingly, the controller 180 can recognize a touched region of the display unit 151. A proximity sensor 141 of the mobile communication terminal 100 will now be described with reference to FIG. 2.

Figure 2:
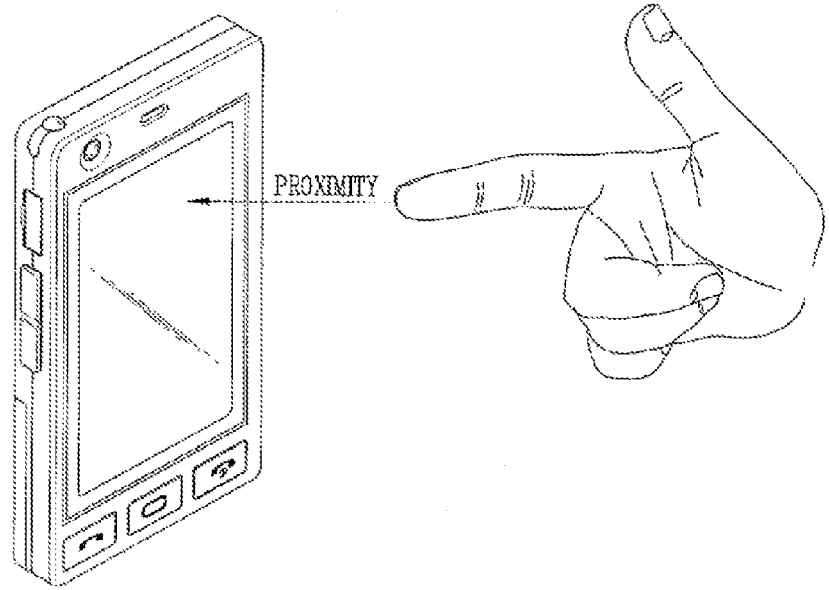
FIG. 2 illustrates a proximity touch.

FIG. 2 illustrates a proximity touch. A proximity touch can, for example, refer to recognition of the pointer positioned to be close to the touch screen without being actually in contact with the touch screen. In addition, a proximity touch can also refer to other touch screen functionality, as discussed above.

The proximity sensor 141 may be disposed within the mobile terminal covered by the touch screen or near the touch screen. The proximity sensor 141 can refer to a sensor for detecting the presence or absence of an object that accesses a certain detection surface or an object that exists nearby by using the force of electromagnetism or infrared rays without a mechanical contact. Thus, the proximity sensor 141 can have a longer life span than a contact type sensor and can be utilized for various purposes.

Examples of a proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. When the touch screen is an electrostatic type touch screen, an approach of the pointer can be detected based on a change in an electric field according to the approach of the pointer. For example, the touch sensor may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch.' In this case, the pointer being in the state of the proximity touch can indicate that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, or a proximity touch movement state), and information corresponding to the detected proximity touch operation and the proximity touch pattern can be outputted to the touch screen.

The audio output module 152 may output audio data received from the wireless communication unit 110 or stored in the memory 160 in various modes. The modes may include a call signal reception mode, a call mode, a record mode, a voice recognition mode, a broadcast reception mode, or other modes. Also, the audio output module 152 may provide audible outputs related to a particular function (e.g., a call signal reception sound or a message reception sound) performed in the mobile terminal 100. The audio output module 152 may include a receiver, a speaker, or a buzzer.

The alarm unit 153 outputs a signal for informing a user about an occurrence of an event of the mobile terminal 100. Events generated in the mobile terminal may include receipt of a call, receipt of a message, or received key or touch inputs. In addition to video or audio signals, the alarm unit 153 may output signals in a different manner, for example, to inform a user about an occurrence of an event. The video or audio signals may be also outputted via the audio output module 152, so the display unit 151 and the audio output module 152 may be classified as parts of the alarm unit 153.

A haptic module 154 generates various tactile effects the user may feel, such as, for example, vibration. The strength and pattern of the haptic module 154 can be controlled. For example, different vibrations may be combined to be outputted or sequentially outputted. Besides vibration, the haptic module 154 may generate various other tactile effects. The generated effects can include stimulation with a pin arrangement moving vertically with respect to a contact skin, a spray force or suction force of air through a jet orifice or a suction opening, a contact on the skin, a contact of an electrode, electrostatic force, and the sense of cold or warmth using an element that can absorb or generate heat. In addition, the haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, or video) that are inputted or outputted. In addition, the memory 160 may store data regarding various patterns of vibrations and audio signals outputted when a touch is inputted to the touch screen.

The memory 160 can be implemented using any type of suitable storage medium, such as, for example, a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 can serve as an interface with external devices connected with the mobile terminal 100. For example, the external devices may transmit data to an external device, receive and transmit power to elements of the mobile terminal 100, or transmit internal data of the mobile terminal 100 to other devices. For example, the interface unit 170 may include wired or wireless headset ports, external power supply ports, wired or wireless data ports, memory card ports, ports for connecting a device having an identification module, audio input/output (I/O) ports, video I/O ports, or earphone ports.

The identification module may be a chip that stores various information for authenticating the authority of using the mobile communication terminal 100. This information may include a UIM, a SIM a USIM, or other information. In addition, the device having the identification module (referred to as 'identifying device', hereinafter) may take the form of a smart card. Accordingly, the identifying device may be connected with the mobile communication terminal 100 via a port. The interface unit 170 may be used to receive inputs (e.g., data, information, or power) from an external device and transfer the received inputs to one or more elements within the mobile communication terminal 100 or may be used to transfer data between the mobile terminal and an external device.

When the mobile communication terminal 100 is connected with an external cradle, the interface unit 170 may serve as a passage to allow power from the cradle to be supplied therethrough to the mobile communication terminal 100 or may serve as a passage to allow various command signals inputted by the user from the cradle to be transferred to the mobile communication terminal 100 therethrough. Various command signals or power inputted from the cradle may operate as signals for recognizing that the mobile communication terminal 100 is properly mounted on the cradle.

The controller 180 can control the general operations of the mobile communication terminal 100. For example, the controller 180 can perform controlling and processing associated with voice calls, data communications, video calls, or other operations. The controller 180 may include a multimedia module 181 for reproducing multimedia data. The multimedia module 181 may be configured within the controller 180 or may be configured to be separated from the controller 180. Also, the controller 180 may perform pattern recognition processing to recognize a handwriting input or a picture drawing input performed on the touch screen as characters or images. The power supply unit 190 receives external power or internal power and supplies power required for operating respective elements and components under the control of the controller 180.

Various embodiments described herein may be implemented in a computer-readable medium using, for example, software, hardware, or a combination thereof.

For hardware implementations, the techniques described below may be implemented by using, for example, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. In some implementations, functionality may be implemented by the controller 180 itself.

For software implementations, the techniques described below may be implemented by separate software modules. Each software module may perform one or more functions or operations described herein. Software codes can be implemented by a software application written in any suitable programming language. The software codes may be stored in the memory 160 and executed by the controller 180. The voice recognition module 182 recognizes a voice pronounced by the user and performs a corresponding function according to the recognized voice signal.

Figure 3:
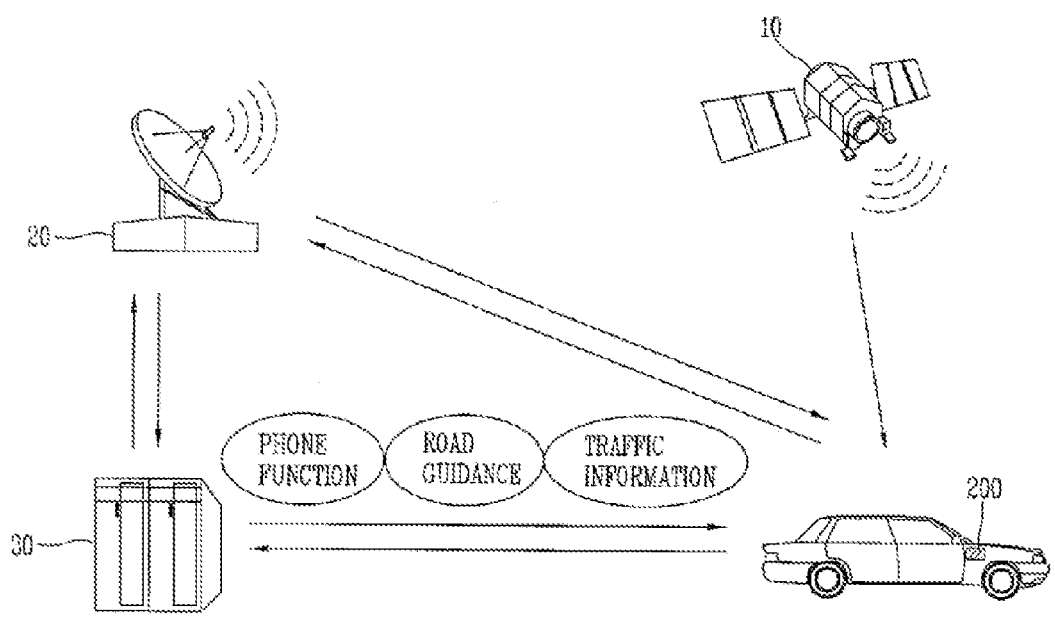
FIG. 3 is a schematic block diagram showing a configuration of a vehicle navigation system.

A navigation session 300 applied to the mobile communication terminal 100 can be used in displaying a travel route. FIG. 3 is a schematic block diagram showing a configuration of a vehicle navigation system. As shown in FIG. 3, a vehicle navigation system includes an information providing center 30 for providing traffic information and various data (e.g., programs, execution, and files). A telematics terminal 200 that is mounted within a vehicle, receives traffic information via a remote wireless communication network 20 and/or short-range wireless communication network, and provides a road guidance service based on a GPS signal received via a satellite 10 and the traffic information.

Figure 4:
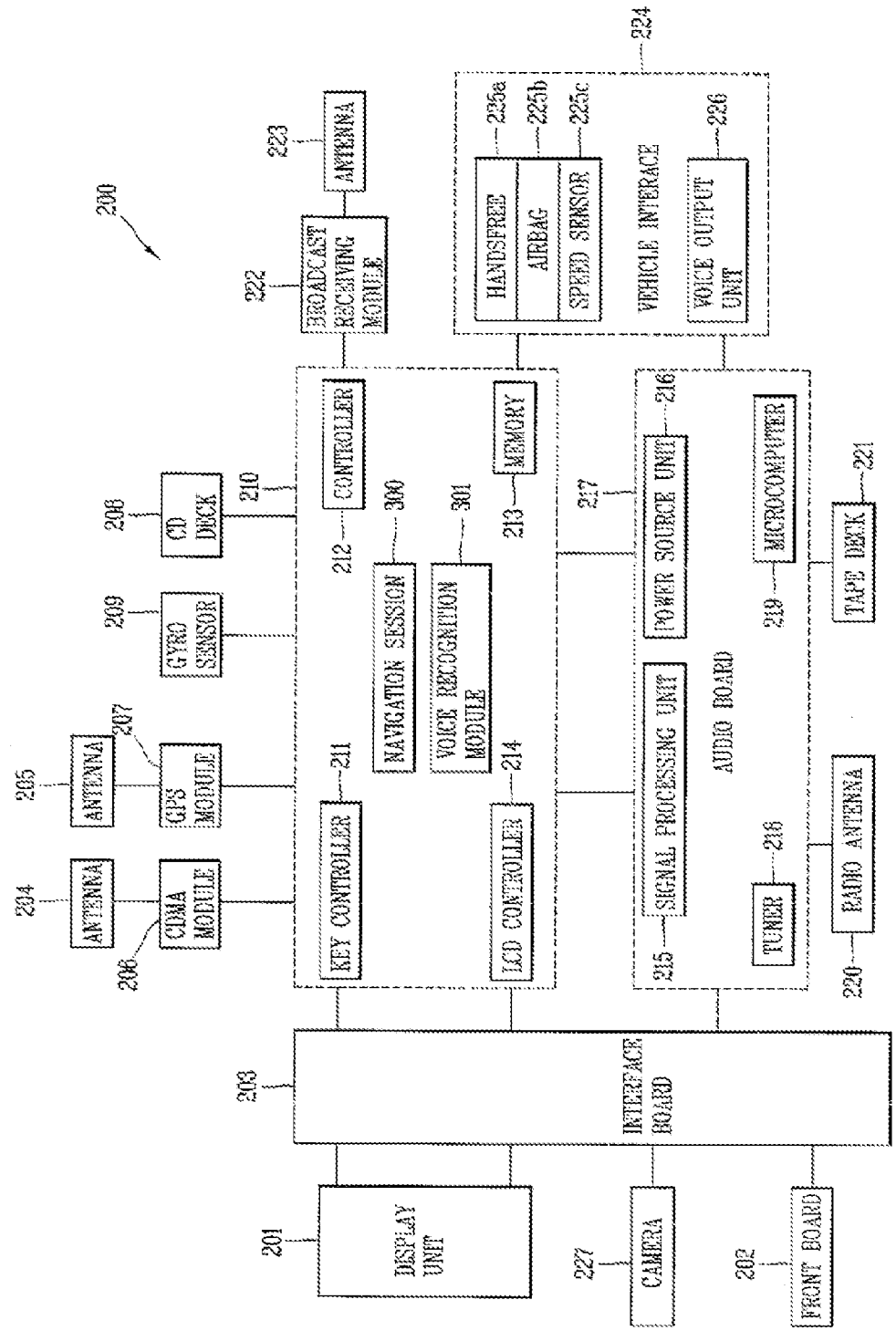
FIG. 4 is a schematic block diagram showing a configuration of a telematics terminal.

The configuration of the telematics terminal 200 according to various implementations is described below with respect to FIG. 4. FIG. 4 is a schematic block diagram showing a configuration of a telematics terminal 200. As shown in FIG. 4, the telematics terminal 200 includes a main board 210 including a controller or CPU (Central Processing Unit) 212 for controlling the telematics terminal 200, memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collection and control algorithm for inputting traffic information according to a present condition of a road on which the vehicle is currently traveling.

The main board 210 includes a Code Division Multiple Access(CDMA) module 206 and a GPS module 207. The GPS module 207 can guide a location of the vehicle, receive a GPS signal for tracking a travel route from a start point to a destination, and transmit traffic information collected by the user as a GPS signal. The main board 210 can also include a CD deck 208 for reproducing a signal recorded in a CD (Compact Disk) and a gyro sensor 209. The CDMA module 206 and the GPS module 207 transmit or receive signals via antennas 204 and 205.

A broadcast receiving module 222 is connected with the main board 210 and receives a broadcast signal via an antenna 223. An LCD 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 can include a proximity sensor and a touch sensor. In addition, the front board 202 can include a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals. Further, the audio board 217 includes a radio antenna 220 for receiving a radio signal and a tape deck 221 for reproducing an audio tape. The audio board 217 may further include a voice output unit 226 including, for example, an amplifier, for outputting a voice signal processed by the audio board 217.

The voice output unit 226 is connected to a vehicle interface 224. Namely, the audio board 217 and the main board 210 are connected to the vehicle interface 224. A hands-free unit 225*a* for inputting a voice signal, an airbag 225*b* configured for the security of a passenger, and a speed sensor 225*c* for detecting the speed of the vehicle, may be connected to the vehicle interface 224. The speed sensor 225*c* calculates a vehicle speed and provides the calculated vehicle speed information to the CPU 212.

The display unit 201 detects a proximity touch within a display window via a proximity sensor. For example, when a pointer (e.g., user's finger or stylus) becomes adjacent to or touches the display unit 201, the display unit 201 detects the position of the proximity touch and outputs position information corresponding to the detected position to the CPU 212. A voice recognition module 301 recognizes a voice pronounced by the user and performs a corresponding function according to the recognized voice signal.

The navigation session 300 applied to the telematics terminal 200 generates road guidance information based on the map data and current location information of the vehicle and provides the generated road guidance information to a user. The vehicle navigation session 300 applied to the telematics terminal 200 displays a travel route on map data, and when the location of the mobile communication terminal 100 is within a pre-set distance from a dead zone included in the travel route, the vehicle navigation session 300 automatically forms a wireless network with a terminal (e.g., a vehicle navigation device) mounted within a nearby vehicle and/or a mobile communication terminal carried around by a nearby pedestrian through radio communication (e.g., a short range wireless communication network), in order to receive location information from one or more of the terminal mounted within the nearby vehicle and the mobile communication terminal carried around by the nearby pedestrian.

Figure 5:
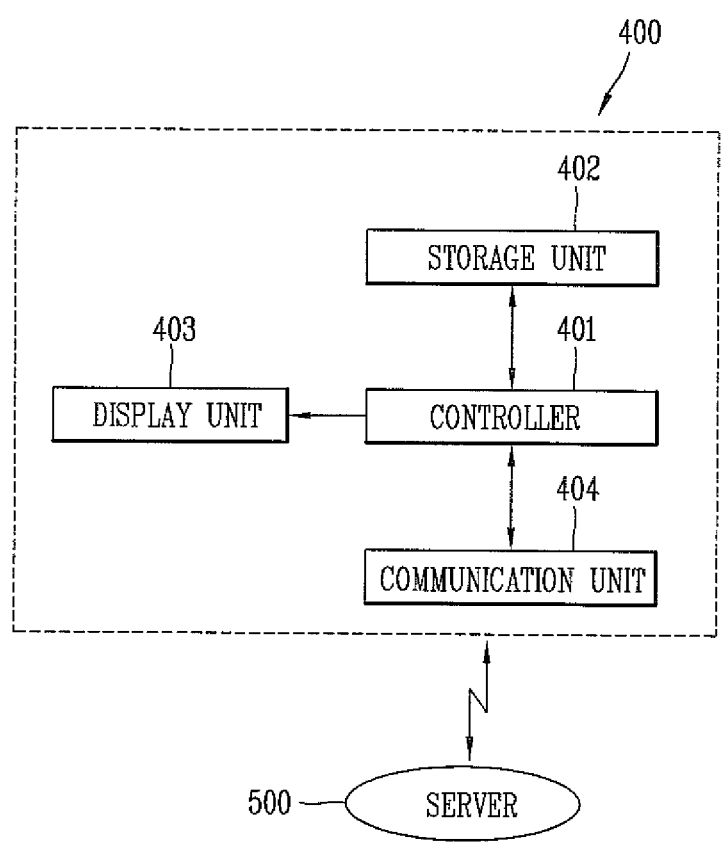
FIG. 5 is a schematic block diagram showing a configuration of a data display apparatus.

FIG. 5 is a schematic block diagram showing a configuration of a data display apparatus. The data display apparatus may be applicable to smart phones, notebook computers, digital broadcasting terminals, PDAs, PMPs, desktop computers, and the mobile communication terminal 100 and the telematics terminal 200.

As shown in FIG. 5, a data display device 500 includes a display unit 403, a storage unit 402 for storing data (e.g., multimedia data) and information related to the data, a controller 401. The controller 401 can be configured to enable display of overview information of first data selected by the user and display of information related to the first data in a map form on the display unit 402 when an icon indicating information in relation to the first data is selected by the user. The data display apparatus 400 may download the data (e.g., multimedia data) and information related to the data from a server 500 via a communication unit 404.

FIG. 6 is a flow chart illustrating a first process for data display. Initially, first data is selected from among a plurality of data items (S11). Next, overview information of the first data is displayed (S12). In particular, when first data is selected by the user from among data items (e.g., multimedia data) displayed on the display unit 403, the controller 401 reads overview information of the first data from the storage unit 402 and displays the overview information on the display unit 403. Here, the first data may be multimedia data such as movie data, music data, photo data, or music album data. The overview information may be overview information regarding movies, music, photos, or other information.

FIGS. 7 and 8 are overviews of display screens illustrating selection of data. As shown in FIG. 7, the controller 401 displays the multimedia data (e.g., movie, music, or photos) on the display unit 403, and when a movie is selected by the user from among the displayed multimedia data, the controller 401 searches one or more of a hard disk drive (HDD), a universal serial bus (USB), a digital living network alliance (DLNA), a common Internet file system (CIFS), and an online server for the selected movie and displays retrieved movie data on the display unit 403.

As shown in FIG. 8, the controller 401 displays movie data which has been searched from one or more of the hard disk drive (HDD), the universal serial bus (USB), the digital living network alliance (DLNA), the common Internet file system (CIFS), and the online server on the display unit 403. When first data (e.g., data regarding the movie "Dark Knight") 8-1 is selected by the user from the movie data displayed on the display unit 403, the controller 401 reads overview information of the first data and displays the read overview information on the display unit 403.

Then, it is determined whether a relation map icon that is displayed on overview information has been selected (S13). Specifically, the controller 401 determines whether or not an icon included in the overview information is selected by the user. The icon can be displayed together with the overview information on the display unit 430 and can indicate information related to the first data.

Figure 9:
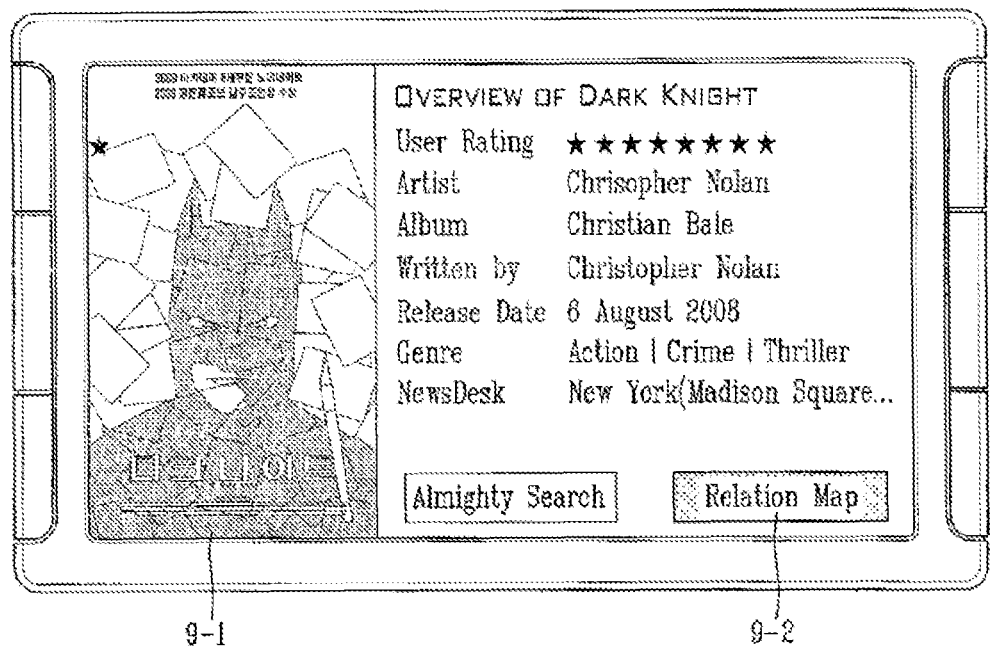
FIG. 9 is an overview of a display screen illustrating overview information.

Hereinafter, the overview information of the first data and the icon indicating the information related to the first data will now be described with reference to FIG. 9. As shown in FIG. 9, when the first data 9-1 (e.g., a poster or representative image of "Dark Knight") is selected by the user from among data displayed on the display unit 403, the controller 401 reads overview information of the first data from the storage unit 402 and displays the read overview information on the display unit 403. The overview information may include information about a director of the movie, information about actors, information about a writer, information about a release date, information about a genre, awards information, News-Desk, or other information.

The overview information may further include almighty search icon. When the almighty search icon is selected by the user, the controller 401 searches movie data (e.g., "Dark Knight") corresponding to the first data 9-1 from the storage unit 402 or the server 500 and reproduces (i.e., plays) the searched movie data. Also, the controller 401 determines whether or not an icon 9-2 displayed on the overview information screen image and indicating information related to the "Dark Knight" 9-1 has been selected. Here, the icon 9-2 refers to an icon searching and indicating various representative image information related to the data (e.g., "Dark Knight" 9-1) selected by the user.

Next, information related to the first data is searched (S14). When the icon included in the overview information is selected by the user, the controller 401 searches the storage unit 402 for information related to the first data. Also, searched information is displayed in map form centering around the first data. That is, when information related to the first data is searched from the storage unit 402, the controller 401 displays the searched information related to the first data in a map form centering around the first data on the display unit 403.

Figure 10:
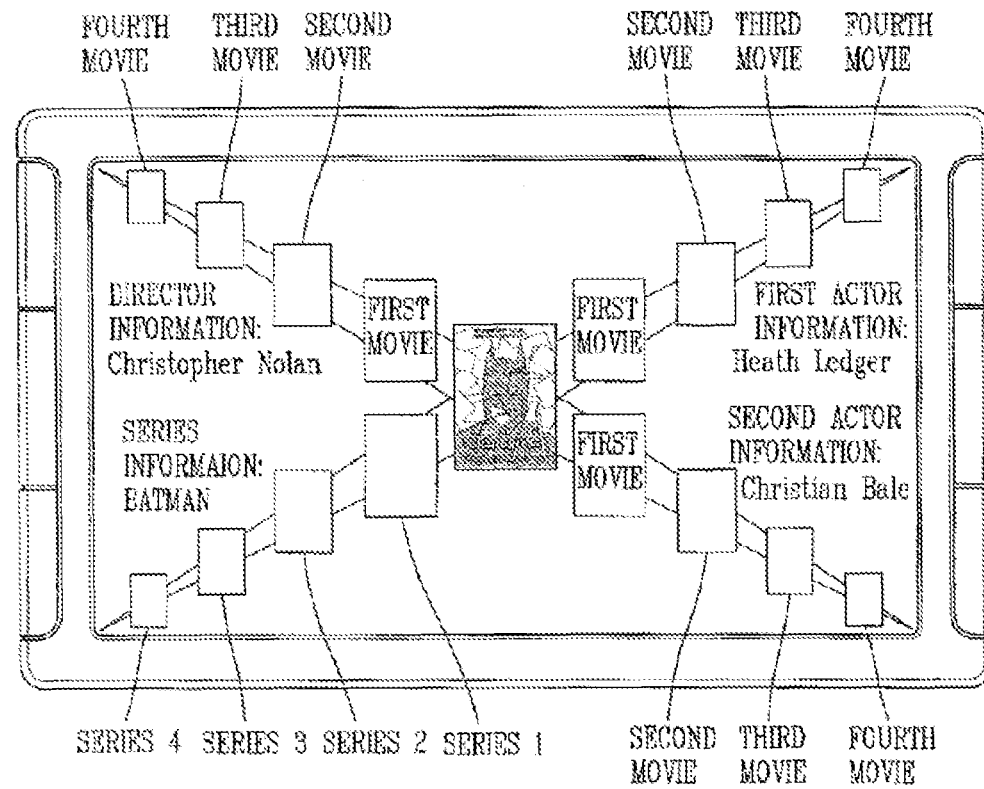
FIG. 10 is an overview of a display screen illustrating information related to a first data item.

FIG. 10 illustrates information related to the first data according to various implementations. As shown in FIG. 10, when the information related to the first data 9-1 is searched from the storage unit 402, the controller 401 displays the searched information related to the first data in a map form centering around the first data 9-1 on the display unit 403. For example, the controller 401 may display representative images (e.g., poster images of films in which Heath Ledger acted) representing first actor information related to the representative image 9-1 of "Dark Knight" in a row on the display unit 403 such that they are gradually reduced in size toward a first direction (e.g., at 45 degrees clockwise) from the poster image 9-1 of "Dark Knight." Namely, the controller 401 sequentially displays the poster images corresponding to the relevant films (e.g., the films in which Heath Ledger acted) in the first direction such that the more recent the films, the closer they are to the poster image 9-1 displayed at the center of the searched information related to the first data.

The controller 401 may display representative images (e.g., poster images of films in which Christian Bale acted) representing second actor information related to the representative image 9-1 of "Dark Knight" in a row on the display unit 403 such that they are gradually reduced in size toward a second direction (e.g., at 135 degrees clockwise) from the poster image 9-1 of "Dark Knight." Namely, the controller 401 sequentially displays the poster images corresponding to the relevant films (e.g., the films in which Christian Bale acted) in the second direction such that the more recent the films, the closer they are to the poster image 9-1 of "Dark Knight" displayed at the center of the searched information related to the first data.

The controller 401 may display poster images representing series information (e.g., "Batman" series 1, 2, 3, . . . ) related to the poster image 9-1 of "Dark Knight" in a row on the display unit 403 such that they are gradually reduced in size toward a third direction (e.g., at 225 degrees clockwise) from the poster image 9-1 of "Dark Knight." Namely, the controller 401 sequentially displays the poster images corresponding to the relevant films (e.g., the "Batman" series films) in the third direction such that the more recent the films, the closer they are to the poster image 9-1 of "Dark Knight" displayed at the center of the searched information related to the first data.

The controller 401 may display representative images (e.g., poster images of films produced by Christopher Nolan) representing director information related to the representative (poster) image 9-1 of "Dark Knight" in a row on the display unit 403 such that they are gradually reduced in size toward a fourth direction (e.g., at 315 degrees clockwise) from the poster image 9-1 of "Dark Knight." Namely, the controller 401 sequentially displays the poster images corresponding to the relevant films (e.g., the films produced by Christopher Nolan) in the fourth direction such that the more recent the films, the closer they are to the poster image 9-1 of "Dark Knight" displayed at the center of the searched information related to the first data.

Here, the controller 401 may display first actor information, second actor information, series information, and director information in various directions according to a setting of a designer, and may further display writer information, genre information, awards information, and other information related to the first data. Also, the controller 401 may download information (e.g., actor information, series information, director information, writer information, genre information, or award information) related to the first data from the server 500 via the communication unit 400 or from an external storage medium (e.g., a USB memory).

Thereafter, it is determined whether first data that is displayed on information in map form has been selected (S16). If so, overview information of the first data is displayed (S17). More specifically, the controller 401 may determine whether or not the first data 9-1 within the information displayed in the map form has been selected again by the user. When the first data 9-1 displayed on the information displayed in the map form is selected by the user, the controller 401 displays overview information of the first data 9-1 on the display unit 403.

In the above description, representative images are described as being within rows in first through fourth directions defined in terms of degrees. This description is exemplary as, the representative images may be placed on a purely linearly axis (as shown in FIG. 10) in specified degree angles or may be placed along a non-linear axis. Whether linear or non-linear in nature, the axis defines the points in which the representative images are placed on the screen. For example, the first through fourth rows may be placed along axes that are curved or spiral in nature. That is, the representative images may be placed at points along a spiral direction away from a central image. Also, the first through fourth rows may be placed along a circular axis, a three-dimensional axis, or an axis with another shape. In addition, various combinations and axes may be used. For example, in one implementation, the first and second rows are linear and the third and fourth rows are spiral.

For simplicity of description, the further implementations described below similarly refer to implementations using linear axes. However, the use of various types of non-linear axes described above also applies to the description below. For example, the rows in FIGS. 12-14 and 17-19 need not be linear and may be, for example, spiral, circular, three-dimensional, or a combination thereof.

Figure 11:
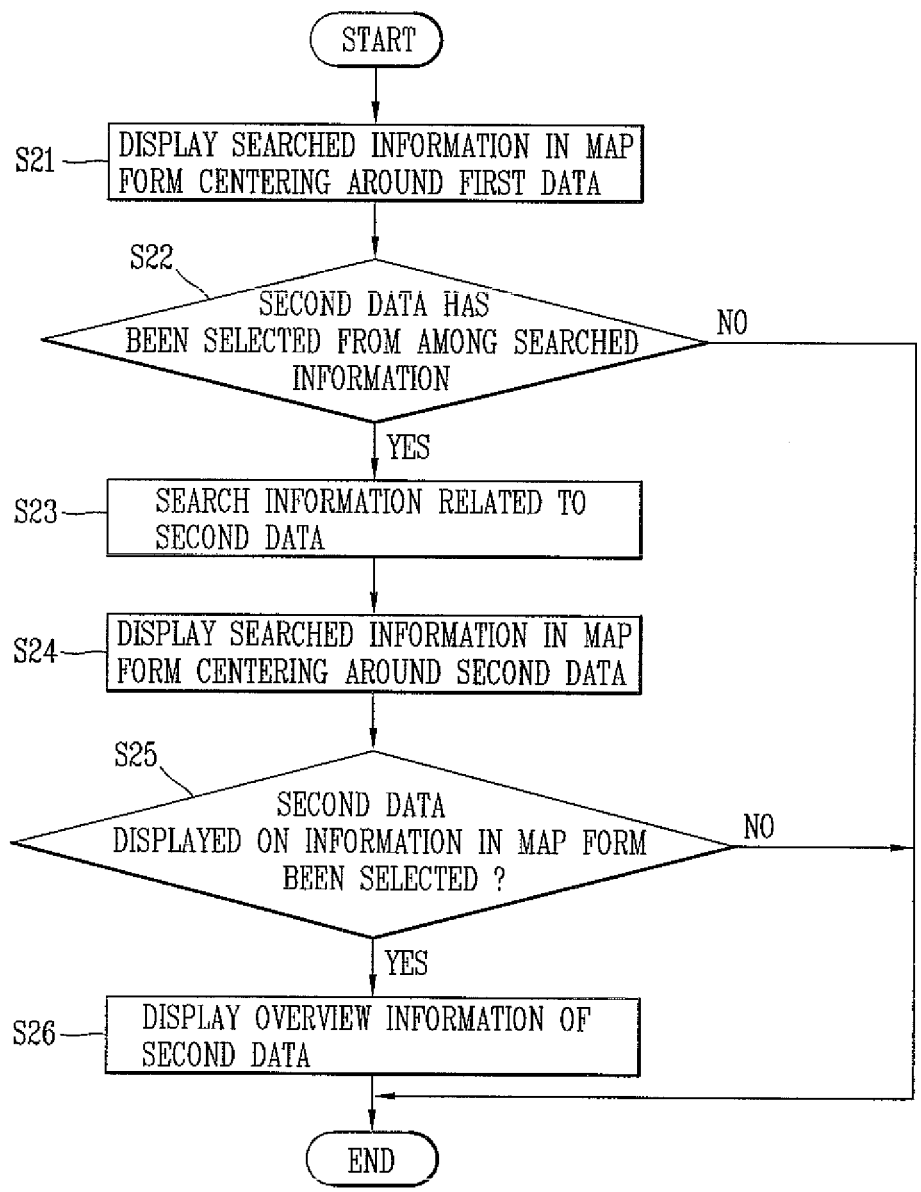
FIG. 11 is a flow chart of a second process for data display.

FIG. 11 is a flow chart of a second process for data display. Initially, when the first data is selected by the user from among data (e.g., multimedia data) displayed on the display unit 403, the controller 401 reads the overview information of the first data from the storage unit 402 and displays the read overview information on the display unit 403. The controller 401 determines whether or not an icon included in the overview information has been selected by the user. When the icon included in the overview information is selected by the user, the controller 401 searches information related to the first data from the storage unit 402.

Search information is displayed in map form centering around first data (S21). That is, when information related to the first data is searched from the storage unit 402, the controller 401 displays the searched information related to the first data in a map form on the display unit 403, centering around the first data. Then, whether second data has been selected from among searched information is determined (S22). For example, the controller 401 determines whether or not second data has been selected by the user from among the information related to the first data (S22). If so, information related to the second data is searched (S23). For example, when the second data is selected by the user from among the information related to the first data, the controller 401 searches information related to the second data from the storage unit 402.

Thereafter, searched information is displayed in map form centering around the second data (S24). More specifically, when information related to the second data is searched from the storage unit 402, the controller 401 displays the searched information related to the second data in a map form on the display unit 403, centering around the second data.

Figure 12:
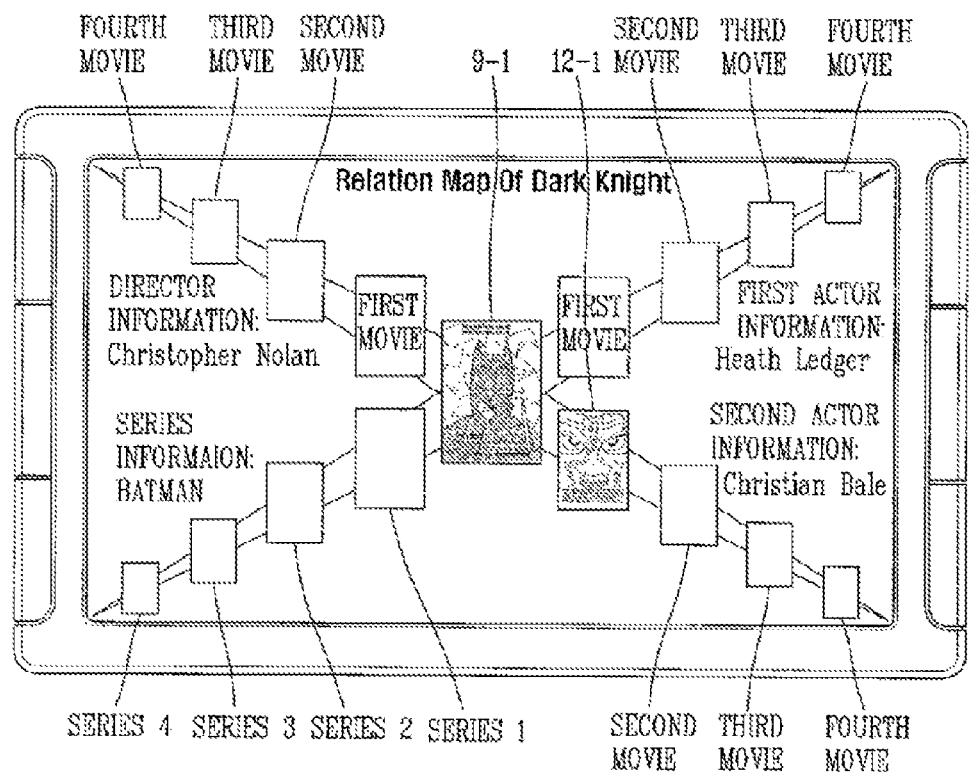
FIGS. 12 and 13 are overviews of display screens illustrating information related to a second data item.
Figure 13:
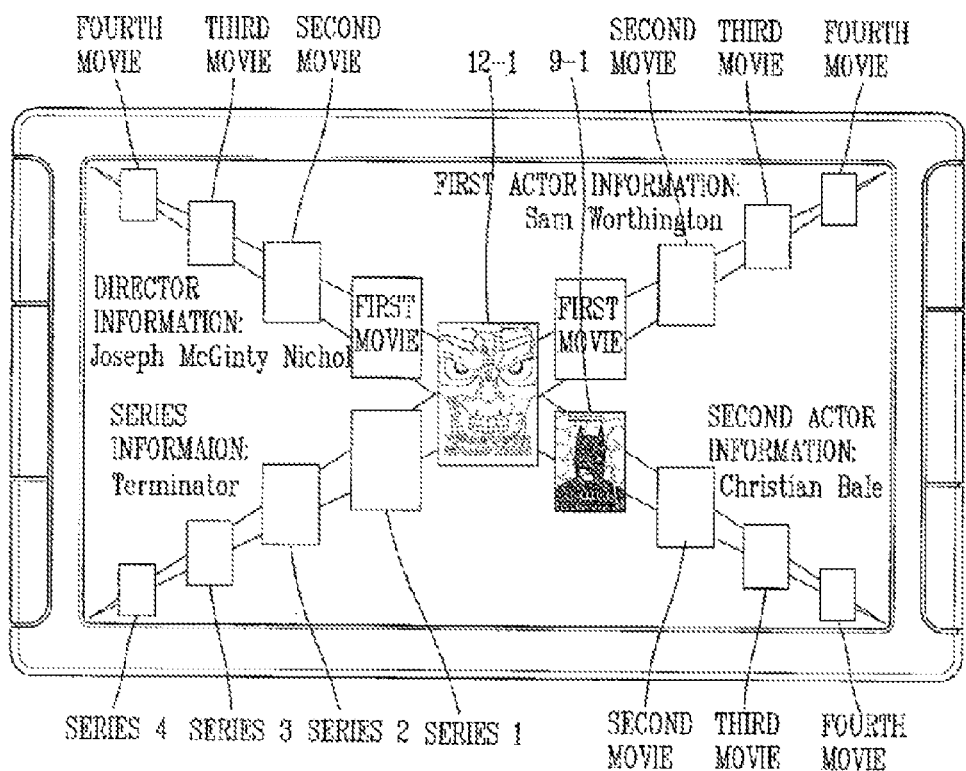

The information related to the second data will now be described with reference to FIGS. 12 and 13. FIGS. 12 and 13 are overviews of display screens illustrating information related to a second data item. As shown in FIG. 12, when information related to second data 12-1 is searched from the storage unit 402, the controller 401 displays the searched information related to the second data in a map form on the display unit 403, centering on the second data 12-1.

As shown in FIG. 13, the controller 401 may display representative images (e.g., poster images of films in which Sam Worthington acted) representing first actor information related to a representative image 12-1 of "Terminator" in a row on the display unit 403 such that they are gradually reduced in size toward a first direction (e.g., at 45 degrees clockwise) from the poster image 12-1 of "Terminator." Namely, the controller 401 sequentially displays the poster images corresponding to the relevant films (e.g., the films in which Sam Worthington acted) in the first direction such that the more recent the films, the closer they are to the poster image 12-1 of Terminator displayed at the center of the searched information related to the second data.

The controller 401 may display representative images (e.g., poster images of films in which Christian Bale acted) representing second actor information related to the representative image 12-1 of "Terminator" in a row on the display unit 403 such that they are gradually reduced in size toward a second direction (e.g., at 135 degrees clockwise) from the poster image 12-1 of "Terminator." Namely, the controller 401 sequentially displays the poster images corresponding to the relevant films (e.g., the films in which Christian Bale acted) in the second direction such that the more recent the films, the closer they are to the poster image 12-1 of "Terminator" displayed at the center of the searched information related to the second data.

The controller 401 may display poster images representing series information (e.g., "Terminator" series 1, 2, 3, . . . ) related to the poster image 12-1 of "Terminator" in a row on the display unit 403 such that they are gradually reduced in size toward a third direction (e.g., at 225 degrees clockwise) from the poster image 12-1 of "Terminator." Namely, the controller 401 sequentially displays the poster images corresponding to the relevant films (e.g., the "Terminator" series films) in the third direction such that the more recent the films, the closer they are to the poster image 12-1 of "Terminator" displayed at the center of the searched information related to the second data.

The controller 401 may display representative images (e.g., poster images of films produced by Joseph McGinty Nichol) representing producer information related to the representative image 12-1 of "Terminator" a row on the display unit 403 such that they are gradually reduced in size toward a fourth direction (e.g., at 315 degrees clockwise) from the poster image 12-1 of "Terminator." Namely, the controller 401 sequentially displays the poster images corresponding to the relevant films (e.g., the films produced by Joseph McGinty Nichol) in the fourth direction such that the more recent the films, the closer they are to the poster image 12-1 of "Terminator" displayed at the center of the searched information related to the second data.

Here, the controller 401 may display first actor information, second actor information, series information, and producer information in various directions according to a setting of a designer, and may further display writer information, genre information, awards information, or other information related to the second data.

Thereafter, it is determined whether second data that is displayed on information in map form has been selected (S25). In particular, the controller 401 may determine whether or not the second data 12-1 displayed on the information displayed in the map form has been selected again by the user. If so, overview information is second data is displayed (S26). That is, when the second data 12-1 displayed on the information displayed in the map form is selected by the user, the controller 401 displays overview information of the second data 12-1 on the display unit 403.

A method of displaying overview information of the second data when the second data is selected again by the user will now be described with reference to FIG. 14. FIG. 14 is an overview of display screens illustrating overview information. As shown in FIG. 14, the controller 401 determines whether or not the second data 12-1 displayed on the information that is displayed in the map form has been selected again by the user. When the second data 12-1 is selected by the user, the controller 401 displays overview information of the second data 12-1 on the display unit 403. The overview information may include a poster image of "Terminator" and director information, actor information, writer information, release date information, genre information, awards information, NewsDesk, or other information.

The overview information further includes an almighty search icon. When the almighty search icon 14-1 is selected by the user, the controller 401 searches movie data (e.g., "Terminator") corresponding to the second data 12-1 from the storage unit 402 or from the server 500, and reproduces (plays) the searched movie data.

Figure 15:
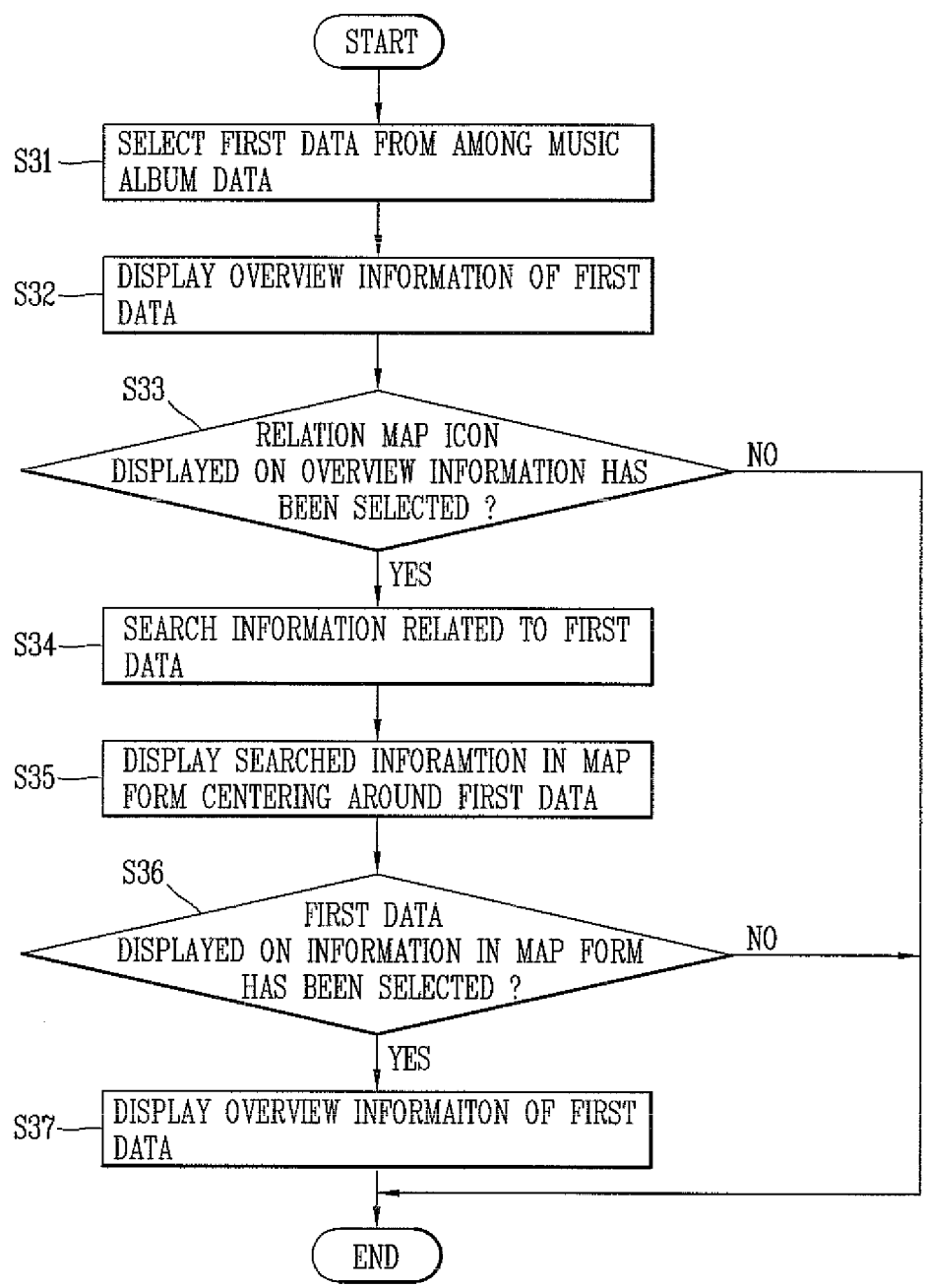
FIG. 15 is a flow chart of a third process for data display.

FIG. 15 is a flow chart illustrating a third process for data display. Initially, first data is selected from among music album data (S31). Then, overview information of the first data is displayed (S32). In particular, when the first data (e.g., first music data) is selected from the data (e.g., music data) displayed on the display unit 403, the controller 401 reads overview data of the first data from the storage unit 402 and displays the read overview information on the display unit 403. Here, the first data may be multimedia data, such as photo data or music data. The overview information may be overview information regarding specific music selected by the user, or overview information regarding photo/music data.

Next, it is determined whether a relational map icon that is displayed on overview information has been selected (S33). Specifically, the controller 401 determines whether or not the icon (e.g., the relation map icon) included in the overview information has been selected by the user. The icon is displayed on the display unit 403 together with the overview information and indicates information related to the first data.

Figure 16:
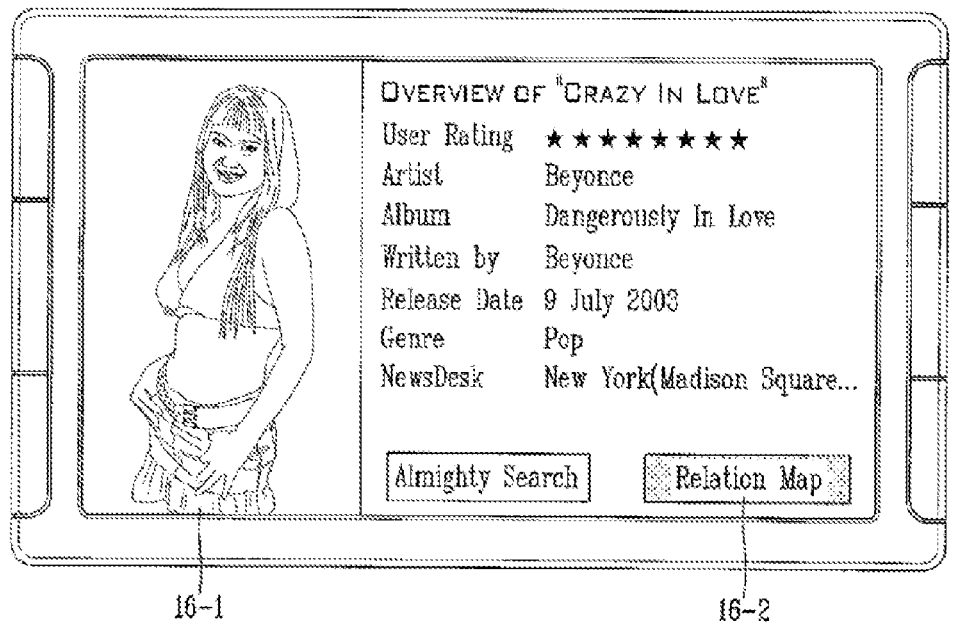
FIG. 16 is an overview of a display screen illustrating overview information.

Hereinafter, icons for indicating the overview information of the first data (music data) and the information related to the first data (music data) will now be described with reference to FIG. 16. FIG. 16 is an overview of a display screen illustrating overview information. As shown in FIG. 16, when first music data 16-1 (e.g., a poster or representative image) of "Crazy In Love" of Beyonce is selected by the user from among a plurality of music data (e.g., posters or music representative images) displayed on the display unit 403, the controller 401 reads overview information of the first music data from the storage unit 402 and displays the read overview information on the display unit 403. The overview information may include information about the singer, the album, the lyrics, a release date, genre, NewsDesk of the title of the song "Crazy In Love."

The overview information further includes an almighty search icon. When the almighty search icon is selected by the user, the controller 401 searches a music file (e.g., "Crazy In Love") corresponding to the first data 16-1 from the storage unit 402 or from the server 500, and reproduces (plays) the searched music data. In addition, the controller 401 determines whether or not an icon 16-2 for indicating information displayed on the overview information and related to the title of the song "Crazy In Love" 16-1 has been selected.

Next, information related to the first data is searched (S34). Then, searched information is displayed in map form centering around the first data (S35). Specifically, when an icon (e.g., a relation map icon) included in the overview information is selected by the user, the controller 401 searches information related to the first music data from the storage unit 402. When the information related to the first music data is searched from the storage unit 402, the controller 401 displays the information related to the searched first data in a map form, centering around the first data, on the display unit 403.

Figure 17:
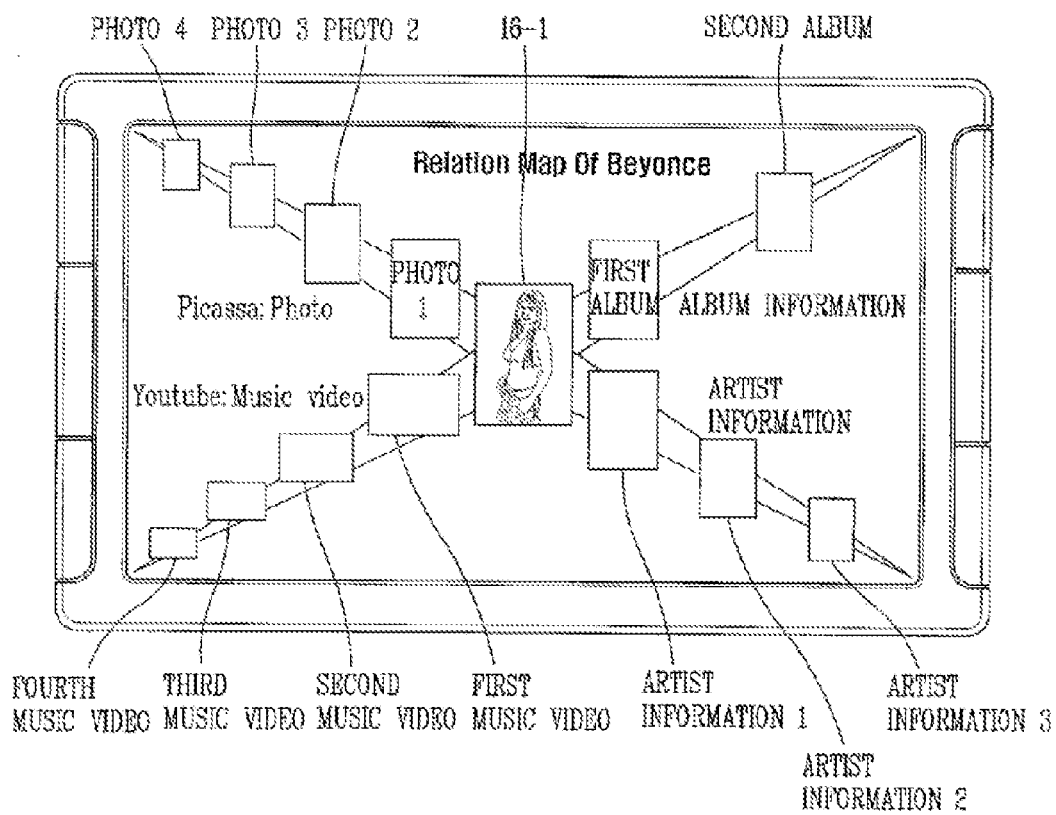
FIG. 17 is an overview of a display screen illustrating information related to a first music data item.

Hereinafter, the information related to the first music data will now be described with reference to FIG. 17. FIG. 17 is an overview of a display screen illustrating information related to a first music data item. As shown in FIG. 17, when information related to the first music data 16-1 is searched from the storage unit 402, the controller 401 displays the searched information related to the first music data in a map form, centering around the first data 16-1, on the display unit 16-1. For example, the controller 401 displays the representative images (e.g., the poster images of a first music album and a second music album) representing album information related to the representative image 16-1 in a row on the display unit 403 such that they are gradually reduced in size toward a first direction (e.g., at 45 degrees clockwise) from the poster image 16-1 of "Crazy In Love." Namely, the controller 401 sequentially displays the poster images corresponding to the relevant music albums in the first direction such that the more recent the music albums, the closer they are to the poster image 16-1 displayed at the center of the searched information related to the music data.

The controller 401 may display representative images (e.g., poster images of songs sung by Beyonce) representing artist (e.g., singer) information related to the representative image 16-1 of "Crazy In Love" in a row on the display unit 403 such that they are gradually reduced in size toward a second direction (e.g., at 135 degrees clockwise) from the poster image 16-1 of "Crazy In Love." Namely, the controller 401 sequentially displays the poster images corresponding to the relevant title of songs in the second direction such that the more recent the songs, the closer they are to the poster image 16-1 of "Crazy In Love" displayed at the center of the searched information related to the first data.

The controller 401 may display poster images representing music video information related to the poster image 16-1 of "Crazy In Love" in a row on the display unit 403 such that they are gradually reduced in size toward a third direction (e.g., at 225 degrees clockwise) from the poster image 16-1 of "Crazy In Love." Namely, the controller 401 sequentially displays the poster images corresponding to the relevant music video in the third direction such that the more recent the music video, the closer they are to the poster image 16-1 of "Crazy In Love" displayed at the center of the searched information related to the first data. Here, the controller 401 may download the music video from a website, such as www.youtube.com.

The controller 401 may display representative images representing photo information (e.g., photo images of the single of "Crazy In Love") related to the representative (poster) image 16-1 of "Crazy In Love" in a row on the display unit 403 such that they are gradually reduced in size toward a fourth direction (e.g., at 315 degrees clockwise) from the poster image 16-1 of "Crazy In Love." Namely, the controller 401 sequentially displays the poster images (here, the poster images may be the photo images) corresponding to the relevant photo images in the fourth direction such that the more recent the photo images, the closer they are to the poster image 16-1 of "Crazy In Love" displayed at the center of the searched information related to the first data. Here, the controller 401 may download the photo images stored in the server 500 through a website, such as www.picassa.com.

Here, the controller 401 may display the album information, artist information, music video information, and the photo information in various directions according to a designer's setting, and may further display composer information, genre information, or other information related to the first data in various forms. Also, the controller 401 may download information (e.g., album information, artist information, music video information, or photo information) related to the first data from the server 500 or an external storage medium (e.g., a USB memory) through the communication unit 404.

Thereafter, it is determined whether the first data that is displayed on information in map form has been selected (S36). If so, overview information of the first data is displayed (S37). For example, the controller 401 determines whether or not the first data 16-1 displayed on the information displayed in the map form is selected again by the user. When the first data 16-1 displayed on the information displayed in the map form is selected by the user, the controller 401 displays overview information of the first data 16-1 on the display unit 403. Meanwhile, when a poster image representing first music video information is selected by the user from among the information displayed in the map form, the controller 401 receives the first music video data through the storage unit 402 or the communication unit 404, and reproduces (plays) the received first music video data.

Figure 18:
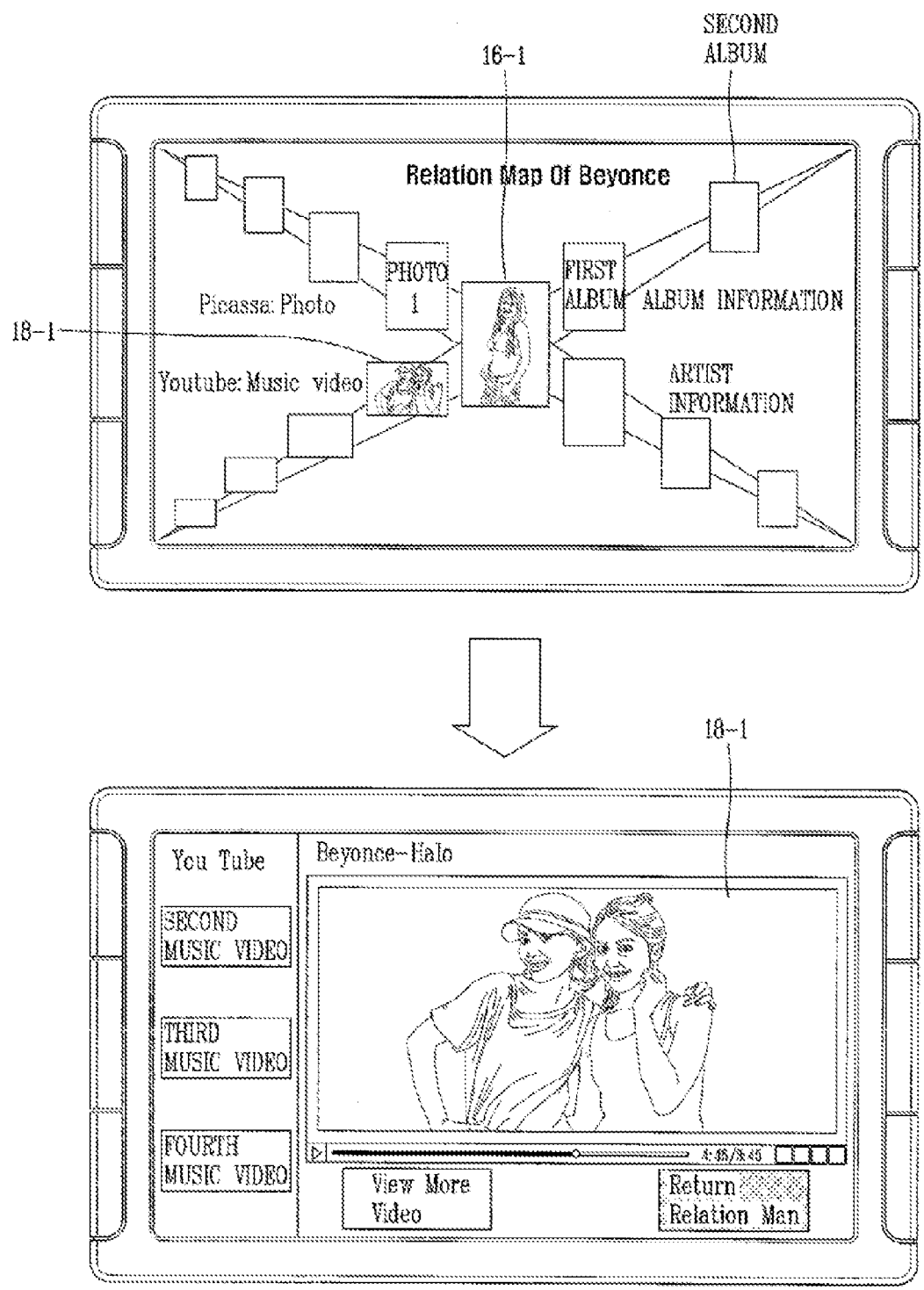
FIG. 18 is an overview of display screens illustrating a method of reproducing music video.

Hereinafter, a method of receiving the first music video data through the storage unit 402 or the communication unit 404 and reproducing the received first music video data when the poster image representing the first music video information is selected by the user will now be described with reference to FIG. 18. FIG. 18 is an overview of display screens illustrating a method of reproducing music video. As shown in FIG. 18, when a poster image 18-1 representing the first music video information is selected by the user, the controller 401 receives first music video data linked to the poster image 18-1 through the storage unit 402 or the communication unit 404 and reproduces (i.e., plays) the received first music video data. In addition, when the first music video data is reproduced, if a return relation map icon displayed on the screen for reproducing the first music video data is selected by the user, the controller 401 displays information related to the first music data again on the display unit 403.

Hereinafter, the method of receiving first photo data through the storage unit 402 or the communication unit 404 and displaying the received first photo data when a poster image representing first photo information is selected by the user from among information displayed in the map form will now be described with reference to FIG. 19. FIG. 19 is an overview of a display screen illustrating a method of displaying a photo image. As shown in FIG. 19, when a poster image 19-1 representing the first photo information is selected by the user, the controller 401 receives first photo data linked to the poster image 19-1 through the storage unit 402 or the communication unit 404, and displays the received first photo data. When the first photo data linked to the poster image 19-1 is displayed, the controller 401 reproduces music corresponding to the photo data. Here, the controller 401 may display the first photo data in the form of a slide show. For example, in displaying the first photo data in the form of a slide show, the controller 401 may set a display time duration of each photo image such that it is the same as a reproduction time duration of music related to each photo image.

In addition, when the first photo data is displayed, if a return relation map icon displayed on the display screen for displaying the first photo data is selected by the user, the controller 401 may display the information related to the first music data again on the display unit 403.

As described above, an apparatus and method for displaying data provides various functionality. This functionality can include the following description.

That is, first, when the first data is selected from among a plurality of data items, overview information of the selected first data is displayed on the display unit, and when an icon included in the overview information and indicating information related to the first data is selected, information related to the first data is displayed in a map form on the display unit. Thus, the user can easily select data.

Second, when the first data is selected from among a plurality of data items, overview information of the selected first data is displayed on the display unit, and when an icon included in the overview information and indicating information related to the first data is selected, information related to the first data is displayed in a map form on the display unit. Thus, information related to the data selected by the user can be intuitively checked.

As the above description may be implemented in various forms without departing from the characteristics thereof, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of displaying categories of information on a mobile terminal, the method comprising:
　receiving a user input selecting a first data item;
　accessing, based on the received user input selecting the first data item, multiple informational categories associated with the selected first data item;
　retrieving multiple data items within a first of the multiple informational categories associated with the selected first data item;
　retrieving multiple data items within a second of the multiple informational categories associated with the selected first data item;
　generating a first relation map for the first data item that includes:
　　the first data item,
　　the multiple retrieved data items within the first informational category arranged according to a first category-based axis that extends away from the first data item, and the multiple retrieved data items within the second informational category arranged according to a second category-based axis that extends away from the first data item, wherein the first category-based axis is different than the second category-based axis;
enabling rendering, on a display of a mobile terminal, the generated first relation map for the first data item;
determining a selection, by the user, of a second data item from within the first relation map of the first data item; and
determining, based on the second data item that was selected from within the first relation map of the first data item, whether to (i) reproduce an image and audio data for the second data item, or (ii) generate a second relation map for the second data item;
wherein the determination is to reproduce the image and audio data for the second data item and reproducing an image and audio data for the second data item comprises:
 displaying, on the display of the mobile terminal and for a first amount of time, an image linked to the second data item; and
 reproducing, for a second period of time, audio data associated with the second data item in response to the second data item being selected.

2. A method comprising:
selecting a first data item;
accessing, based on the selection of the first data item, multiple informational categories associated with the selected first data item;
retrieving multiple data items within a first of the multiple informational categories associated with the selected first data item;
retrieving multiple data items within a second of the multiple informational categories associated with the selected first data item;
enabling generation and display, on a display of a device, of a first relation map for the first data item that includes:
 the first data item,
 the multiple retrieved data items within the first informational category arranged according to a first category-based axis that extends away from the first data item, and
 the multiple retrieved data items within the second informational category arranged according to a second category-based axis that extends away from the first data item, wherein the first category-based axis is different than the second category-based axis;
selecting a second data item from within the first relation map of the first data item; and
determining, based on the second data item that was selected from within the first relation map of the first data item, whether to (i) reproduce an image and audio data for the second data item, or (ii) generate a second relation map for the second data item;
wherein the determination is to reproduce the image and audio data for the second data item and reproducing an image and audio data for the second data item comprises:
 displaying, on the display of the device and for a first period of time, an image linked to the second data item; and
 reproducing, for a second period of time, audio data associated with the second data item in response to the second data item being selected.

3. The method of claim 2 wherein:
selecting the first data item includes selecting a data item that corresponds to a first movie;
accessing the multiple informational categories associated with the selected first data item includes accessing multiple informational categories associated with the first movie;
retrieving the multiple data items within the first of multiple informational categories includes retrieving multiple data items corresponding to other movies starring an actor who acted in the first movie;
retrieving the multiple data items within the second of multiple informational categories includes retrieving multiple data items corresponding to other movies directed by a director who directed the first movie; and
enabling generation of the display includes enabling generation of a display that renders an icon corresponding to the first movie, icons corresponding to the other movies starring the actor who acted in the first movie arranged in a row according to the first category-based axis that extends away from the icon corresponding to the first movie, and icons corresponding to the other movies directed by the director who directed the first movie arranged in a row according to the second category-based axis that extends away from the icon corresponding to the first movie.

4. The method of claim 2 wherein:
selecting the first data item includes selecting a data item that corresponds to an artist;
accessing the multiple informational categories associated with the selected first data item includes accessing multiple informational categories associated with the artist;
retrieving the multiple data items within the first of multiple informational categories includes retrieving multiple data items corresponding to songs by the artist;
retrieving the multiple data items within the second of multiple informational categories includes retrieving multiple data items corresponding to photos of the artist; and
enabling generation of the display includes enabling generation of a display that renders an icon corresponding to the artist, icons corresponding to the songs by the artist arranged in a row according to the first category-based axis that extends away from the icon corresponding to the artist, and icons corresponding to the photos of the artist arranged in a row according to the second category-based axis outward that extends away from the icon corresponding to the artist.

5. The method of claim 4 further comprising:
receiving a selection of a first icon of the rendered icons corresponding to the songs by the artist arranged in the row according to the first category-based axis that extends away from the icon corresponding to the artist;
accessing, based on the selection of the first icon, a media item of the song to which the selected first icon corresponds; and
enabling rendering of the accessed media item.

6. The method of claim 2 wherein selecting a first data item includes receiving user input selecting an item rendered on a display of a mobile terminal.

7. The method of claim 2 wherein accessing the multiple informational categories associated with the selected first data item includes accessing, from computer-readable memory, an association between the multiple informational categories and the selected first data item.

8. The method of claim 2 wherein:
retrieving the multiple data items within the first informational category includes retrieving, from computer-readable memory of a mobile terminal, the multiple data items within the first informational category; and
retrieving the multiple data items within the second informational category includes retrieving, from the computer-readable memory of the mobile terminal, the multiple data items within the second informational category.

9. The method of claim 2 wherein:
retrieving the multiple data items within the first informational category includes retrieving, from an Internet website, the multiple data items within the first informational category; and
retrieving the multiple data items within the second informational category includes retrieving, from the Internet website, the multiple data items within the second informational category.

10. The method of claim 2 wherein the first category-based axis is a linear axis with a first angle relative to a reference line and the second category-based axis is a linear axis with a second angle relative to the reference line that differs from the first angle.

11. The method of claim 10 wherein the second angle is perpendicular to the first angle.

12. The method of claim 2 further comprising:
retrieving multiple data items within a third of the multiple informational categories associated with the selected first data item; and
retrieving multiple data items within a fourth of the multiple informational categories associated with the selected first data item,
wherein enabling generation of the display includes enabling generation of a display that includes the first data item, the multiple retrieved data items within the first informational category arranged according to a first category-based axis that extends away from the first data item, the multiple retrieved data items within the second informational category arranged according to a second category-based axis that extends away from the first data item, the multiple retrieved data items within the third informational category arranged according to a third category-based axis that extends away from the first data item, and the multiple retrieved data items within the fourth informational category arranged according to a fourth category-based axis that extends away from the first data item.

13. The method of claim 2 wherein enabling generation of the display includes enabling generation of a display that renders icons corresponding to the multiple retrieved data items within the first informational category arranged in a row according to the first category-based axis that extends away from the first data item and that renders icons corresponding to the multiple retrieved data items within the second informational category arranged in a row according to the second category-based axis that extends away from the first data item.

14. The method of claim 13 further comprising:
receiving a selection of a first icon of the rendered icons corresponding to the multiple retrieved data items within the first informational category arranged in the row according to the first category-based axis that extends away from the first data item;
accessing, based on the selection of the first icon, information corresponding to the selected first icon; and
enabling rendering of the accessed information corresponding to the selected first icon.

15. A device comprising:
a computer-readable memory;
a display; and
a controller configured to:
receive a user input selecting a first data item,
access, based on a selection of the first data item and from the computer-readable memory, multiple informational categories associated with the selected data item,
retrieve multiple data items within a first of multiple informational categories associated with the selected first data item,
retrieve multiple data items within a second of multiple informational categories associated with the selected first data item,
enable rendering, on the display of the device, a first relation map for the first data item that includes:
the selected first data item,
the multiple retrieved data items within the first informational category arranged according to a first category-based axis that extends away from the first data item, and
the multiple retrieved data items within the second informational category arranged according to a second category-based axis that extends away from the first data item, wherein the first category-based axis is different than the second category-based axis,
receive a selection, by the user, of a second data item from within the first relation map of the first data item; and
determine, based on the second data item that was selected from within the first relation map of the first data item, whether to (i) reproduce an image and audio data for the second data item, or (ii) generate a second relation map for the second data item;
wherein the determination is to reproduce the image and audio data for the second data item and reproducing an image and audio data for the second data item comprises:
display, on the display of the device and for a first period of time, an image linked to the second data item, and
reproduce, for a second period of time, audio data associated with the second data item in response to the second data item being selected.

16. The device of claim 15 wherein, to access the multiple informational categories associated with the selected data item, the controller is configured to access, from the computer-readable memory, an association between the multiple informational categories and the selected first data item.

17. The device of claim 15 wherein:
to retrieve the multiple data items within the first informational category, the controller is configured to retrieve, from the computer-readable memory, the multiple data items within the first informational category; and
to retrieve the multiple data items within the second informational category, the controller is configured to retrieve, from the computer-readable memory, the multiple data items within the second informational category.

18. The device of claim 15 wherein:
to retrieve the multiple data items within the first informational category, the controller is configured to retrieve, from an Internet website, the multiple data items within the first informational category; and
to retrieve the multiple data items within the second informational category, the controller is configured to retrieve, from the Internet website, the multiple data items within the second informational category.

19. The device of claim 15 wherein the first category-based axis is a linear axis with a first angle relative to a reference line and the second category-based axis is a linear axis with a second angle relative to a reference line that differs from the first angle.

20. The device of claim 19 wherein the second angle is perpendicular to the first angle.

21. The device of claim 15 wherein, to enable rendering, the controller is configured to enable rendering of an icon corresponding to the first data item, icons corresponding to the multiple retrieved data items within the first informational category arranged in a row according to the first category-based axis that extends away from the icon corresponding to the first data item, and icons corresponding to the multiple retrieved data items within the second informational category arranged in a row according to the second category-based axis that extends away from the icon corresponding to the first data item.

22. The device of claim 15 wherein the controller includes one or more processors.

23. A method comprising:
selecting a first data item;
accessing, based on the selection of the first data item, multiple informational categories associated with the selected first data item;
retrieving multiple data items within a first of multiple informational categories associated with the selected first data item;
retrieving multiple data items within a second of multiple informational categories related to the selected first data item;
enabling generation and display, on a display of a device, of a first relation map for the first data item that includes:
the first data item,
the multiple retrieved data items within the first informational category arranged according to a first category-based axis that extends away from the first data item, and
the multiple retrieved data items within the second informational category arranged according to a second category-based axis that extends away from the first data item, wherein the first category-based axis is different than the second category-based axis;
selecting a second data item from within the first relation map of the first data item; and
determining, based on the second data item that was selected from within the first relation map of the first data item, whether to (i) reproduce an image and audio data for the second data item, or (ii) generate a second relation map for the second data item;
wherein the determination is to generate a second relation map for the second data item and generating the second relation map for the second data item comprises:
accessing, based on the selection of the second data item, multiple informational categories associated with the selected second data item;
retrieving multiple data items within a third of multiple informational categories associated with the selected second data item;
retrieving multiple data items within a fourth of multiple informational categories related to the selected second data item;
enabling generation and display, on a display of a device, of the second relation map for the second data item that includes:
the second data item,
the multiple retrieved data items within the third informational category arranged according to a third category-based axis that extends away from the second data item, and
the multiple retrieved data items within the fourth informational category arranged according to a fourth category-based axis that extends away from the second data item, wherein the third category-based axis is different than the fourth category-based axis.

24. The method of claim 1, wherein:
a predetermined order with which the multiple retrieved data items within the second informational category are displayed on the second category-based axis is based on a time-based relationship between the multiple retrieved data items within the second informational category and the first data item.

25. The method of claim 2, wherein:
a predetermined order with which the multiple retrieved data items within the second informational category are displayed on the second category-based axis is based on a time-based relationship between the multiple retrieved data items within the second informational category and the first data item.

26. The device of claim 15, wherein:
a predetermined order with which the multiple retrieved data items within the second informational category are displayed on the second category-based axis is based on a time-based relationship between the multiple retrieved data items within the second informational category and the first data item.

27. The method of claim 1, wherein:
the first period of time is substantially equal to the second period of time, and
each of the multiple retrieved data items within the first informational category are displayed, on the first category-based axis in a predetermined order from the first data item and each of the multiple retrieved data items within the second informational category are displayed on the second category-based axis in the predetermined order from the first data item.

28. The method of claim 1, wherein a size with which the second data item of the multiple retrieved data items is displayed is gradually reduced as the distance with which the second data item is displayed from the first data item increases, and
wherein a predetermined order with which the multiple retrieved data items within the first informational category are displayed on the first category-based axis is based on a time-based relationship between the multiple retrieved data items within the first informational category and the first data item, and a predetermined order with which the multiple retrieved data items within the second informational category are displayed on the second category-based axis is based on a time-based relationship between the multiple retrieved data items within the second informational category and the first data item.

29. The method of claim 1, wherein generating the second relation map for the second data item comprises:

accessing, based on the selection of the second data item, multiple informational categories associated with the selected second data item;

retrieving multiple data items within a third of multiple informational categories associated with the selected second data item;

retrieving multiple data items within a fourth of multiple informational categories related to the selected second data item;

enabling generation and display, on a display of a device, of the second relation map for the second data item that includes:

the second data item, the multiple retrieved data items within the third informational category arranged according to a third category-based axis that extends away from the second data item, and the multiple retrieved data items within the fourth informational category arranged according to a fourth category-based axis that extends away from the second data item, wherein the third category-based axis is different than the fourth category-based axis.

* * * * *